United States Patent
Sundararajan et al.

(10) Patent No.: US 10,454,541 B2
(45) Date of Patent: Oct. 22, 2019

(54) DYNAMIC UPLINK ANTENNA PORT MANAGEMENT

(71) Applicant: QUALCOMM Incorporated, San Diego, CA (US)

(72) Inventors: Jay Kumar Sundararajan, San Diego, CA (US); Wanshi Chen, San Diego, CA (US); Haitong Sun, San Diego, CA (US); Jing Jiang, San Diego, CA (US); Hao Xu, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/470,353

(22) Filed: Mar. 27, 2017

(65) Prior Publication Data

US 2018/0048366 A1 Feb. 15, 2018

Related U.S. Application Data

(60) Provisional application No. 62/374,545, filed on Aug. 12, 2016.

(51) Int. Cl.
*H04B 7/0456* (2017.01)
*H04B 17/345* (2015.01)
(Continued)

(52) U.S. Cl.
CPC .......... *H04B 7/0456* (2013.01); *H04B 7/061* (2013.01); *H04B 17/345* (2015.01); *H04L 5/00* (2013.01);
(Continued)

(58) Field of Classification Search
CPC .... H04B 7/0456; H04B 17/345; H04B 7/061; H04B 7/0413; H04L 5/0048; H04W 72/042
See application file for complete search history.

(56) References Cited

U.S. PATENT DOCUMENTS

2010/0215114 A1 8/2010 Kim et al.
2011/0111781 A1* 5/2011 Chen .................. H04B 7/02
455/507

(Continued)

FOREIGN PATENT DOCUMENTS

WO WO-2010/050874 A1 5/2010

OTHER PUBLICATIONS

International Search Report and Written Opinion—PCT/US2017/045590—ISA/EPO—Nov. 2, 2017. (16 total pages).

*Primary Examiner* — Janice N Tieu
(74) *Attorney, Agent, or Firm* — Arent Fox, LLP

(57) ABSTRACT

Various aspects described herein relate to dynamic uplink antenna port management. A user equipment (UE) may receive reference signal configuration information from a base station. The UE may configure one or more uplink antenna ports based on the received reference signal configuration information and transmit one or more reference signals to the base station on the one or more uplink antenna port. The UE may receive uplink configuration information for one or more data channels and/or one or more control channels. The UE may configure one or more uplinks antenna ports based on the uplink configuration information and may transmit one or more uplink signals on the one or more data channels and/or one or more control channels. The uplink configuration information may be based at least one the one or more reference signals transmitted to the base station.

30 Claims, 11 Drawing Sheets

(51) Int. Cl.
  *H04B 7/06*      (2006.01)
  *H04L 5/00*      (2006.01)
  *H04W 72/04*     (2009.01)
  *H04B 7/0413*    (2017.01)

(52) U.S. Cl.
  CPC .......... *H04L 5/0023* (2013.01); *H04L 5/0048* (2013.01); *H04L 5/0051* (2013.01); *H04L 5/0053* (2013.01); *H04W 72/042* (2013.01); *H04B 7/0413* (2013.01)

(56) References Cited

U.S. PATENT DOCUMENTS

| | | | |
|---|---|---|---|
| 2011/0194504 A1* | 8/2011 | Gorokhov | H04B 7/0417 370/329 |
| 2012/0176939 A1 | 7/2012 | Qu et al. | |
| 2014/0362799 A1 | 12/2014 | Kim et al. | |
| 2015/0208251 A1* | 7/2015 | Lim | H04B 7/0456 370/328 |
| 2017/0104572 A1* | 4/2017 | Liu | H04L 5/0014 |

* cited by examiner

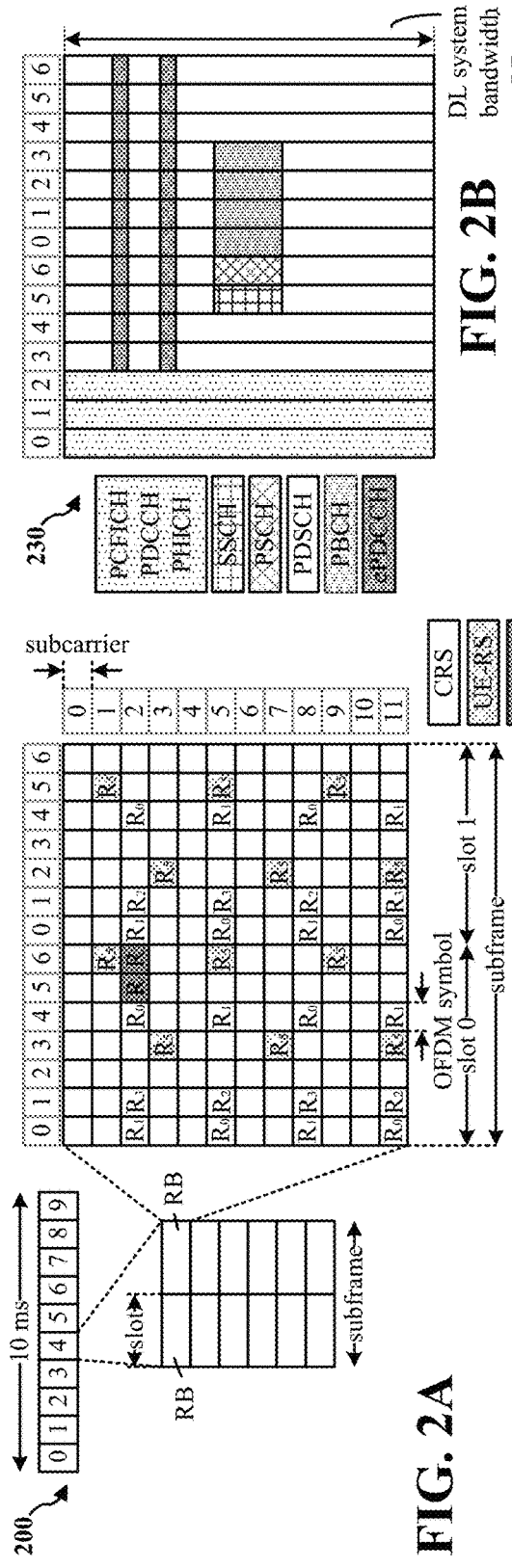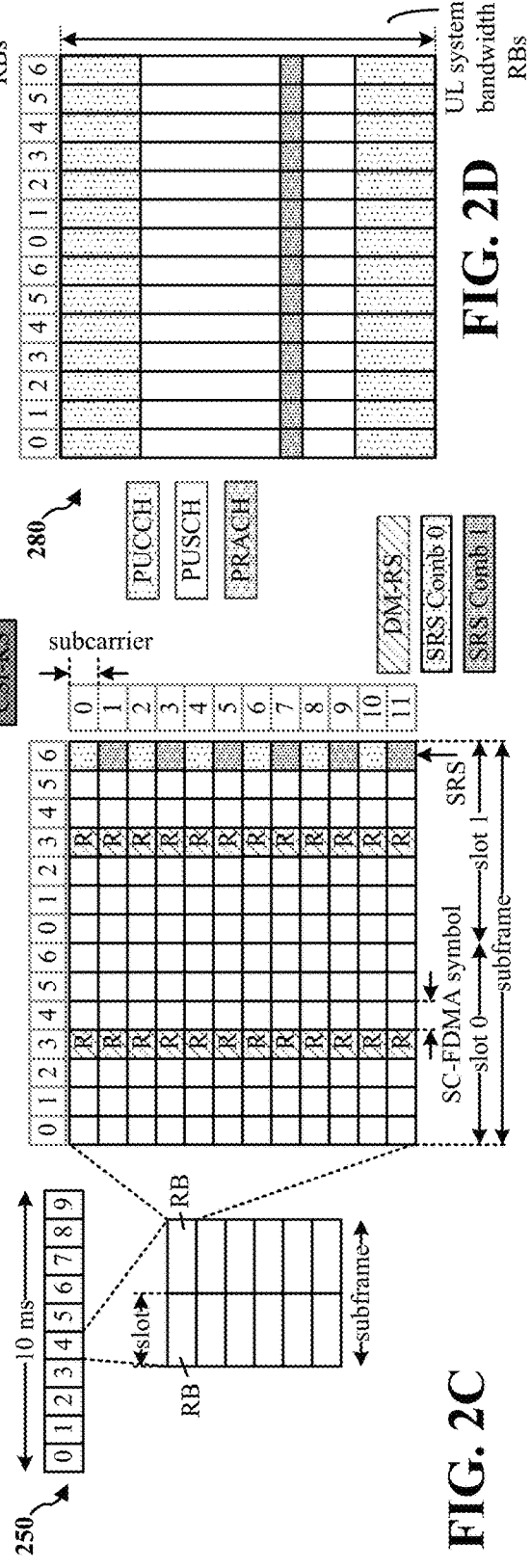
FIG. 2A
FIG. 2B
FIG. 2C
FIG. 2D

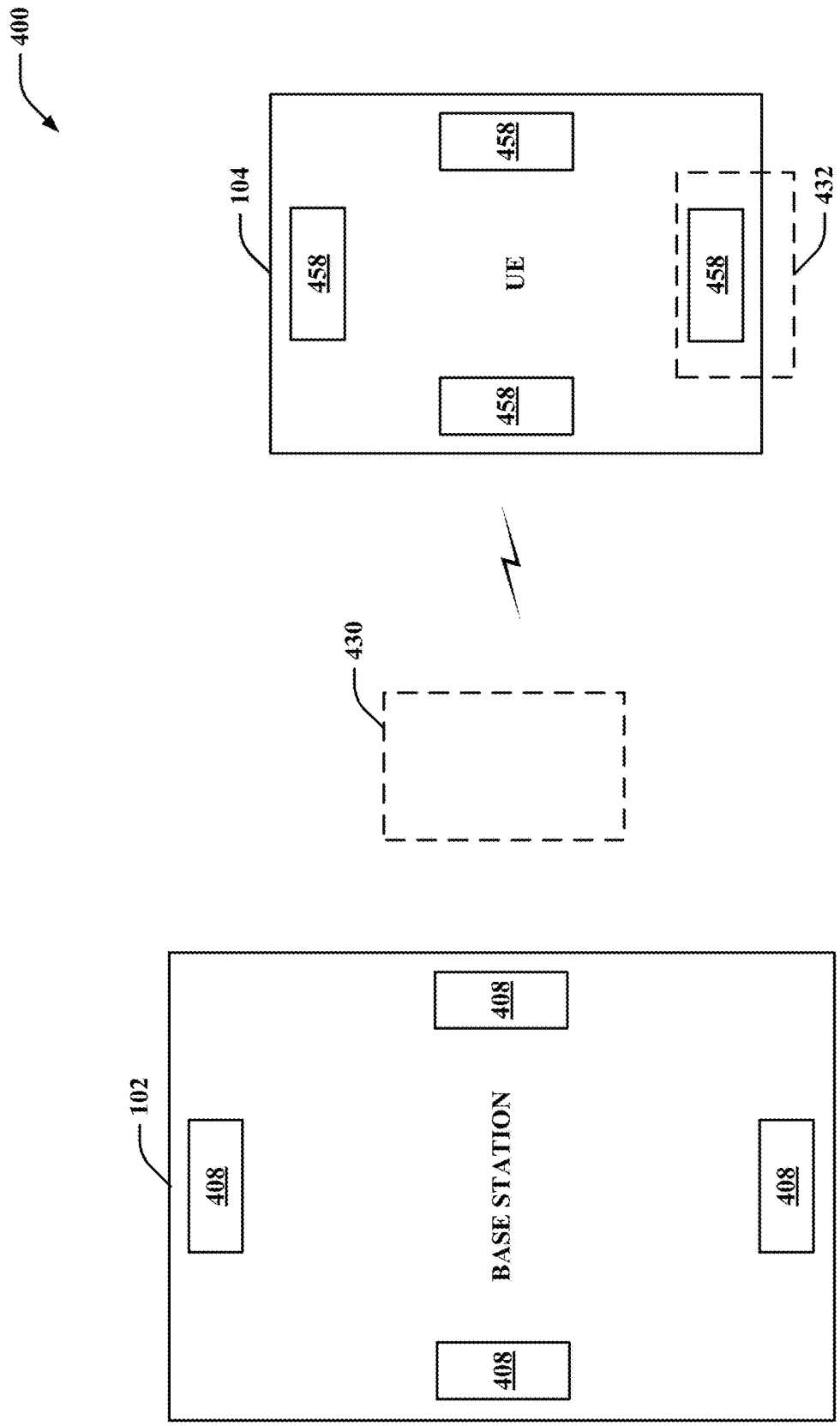

DYNAMIC UPLINK ANTENNA PORT MANAGEMENT

CLAIM OF PRIORITY UNDER 35 U.S.C. § 119

The present Application for Patent claims priority to U.S. Provisional Application No. 62/374,545 entitled "DYNAMIC UPLINK ANTENNA PORT MANAGEMENT" filed Aug. 12, 2016, which is assigned to the assignee hereof and expressly incorporated by reference herein.

BACKGROUND

Aspects of this disclosure relate generally to telecommunications, and more particularly to techniques for dynamic uplink antenna port management.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

In conventional systems, a user equipment (UE) may include a large number of antennas (e.g., 4 or 8 antennas), especially at high carrier frequencies such as, but not limited to, millimeter wave. In conventional systems, the UE can transmit reference signals, control signals and data signals in accordance with one or more precoding schemes known to the UE, e.g., based on one or more previously connections to a base station. These previously used precoding scheme(s) may be outdated because conditions may have changed between a previous connection and a current connection. Depending on the form factor of the UE and the usage pattern of the user of the UE, some of the antennas of the UE may have a different extent of blocking than other antennas. For example, some antennas of the UE may be blocked by a hand of the user or some other obstacle in an environment of the UE. Further, different antennas of the UE may be located at different positions on the UE which may result in a permanent imbalance between the different antennas in terms of signal strength. As a result, each antenna of the UE may have an imbalance in channel quality between the antenna and a base station. Moreover, certain beamforming directions may be blocked due to the presence of an obstacle in the environment of the UE. The base station may not be aware of such antenna imbalances or obstacle(s) and therefore, the base station may not select an optimal precoding scheme for uplink or downlink transmissions. Thus, improvements in selecting precoding schemes for uplink and downlink transmissions are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, the present disclosure provides a method for wireless communication. The method includes receiving, by a user equipment (UE), reference signal configuration information from a base station, configuring, by the UE, one or more uplink antenna ports of the UE based on the received reference signal configuration information, and transmitting, by the UE, one or more reference signals to the base station on the one or more antenna ports in accordance with the received reference signal configuration information.

In accordance with another aspect, the present disclosure provides an apparatus (e.g., UE) for wireless communication, the apparatus including a transceiver, a memory configured to store instructions and one or more processors communicatively coupled with the transceiver and memory. The one or more processors are configured to execute the instructions to receive, by a user equipment (UE), reference signal configuration information from a base station, configure, by the UE, one or more uplink antenna ports of the UE based on the received reference signal configuration information, and transmit, by the UE, one or more reference signals to the base station on the one or more antenna ports in accordance with the received reference signal configuration information.

In accordance with another aspect, the present disclosure provides a method for wireless communication. The method includes determining, by a base station, reference signal configuration information, transmitting, by the base station, the reference signal configuration information to a user equipment (UE), the reference signal configuration information including one or more precoding schemes, and receiving, by the base station, one or more reference signals transmitted by the UE in accordance with the reference signal configuration information and the one or more precoding schemes.

In accordance with another aspect, the present disclosure provides an apparatus (e.g., base station) for wireless communication, the apparatus including a transceiver, a memory configured to store instructions and one or more processors communicatively coupled with the transceiver and memory. The one or more processors are configured to execute the instructions to determine, by the base station, reference signal configuration information, transmit, by the base station, the reference signal configuration information to a user equipment (UE), the reference signal configuration information including one or more precoding schemes, and receive, by the base station, one or more reference signals transmitted by the UE in accordance with the reference signal configuration information and the one or more precoding schemes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a downlink (DL) frame structure in accordance with various aspects of the present disclosure.

FIG. 2B is a diagram illustrating an example of DL channels within the DL frame structure in accordance with various aspects of the present disclosure.

FIG. 2C is a diagram illustrating an example of a uplink (UL) frame structure in accordance with various aspects of the present disclosure.

FIG. 2D is a diagram of an example of UL channels within the UL frame structure in accordance with various aspects of the present disclosure.

FIG. 4A is a first diagram illustrating an example of a wireless communication system for dynamic antenna port management, in accordance with various aspects of the present disclosure.

DETAILED DESCRIPTION

Figure 1:
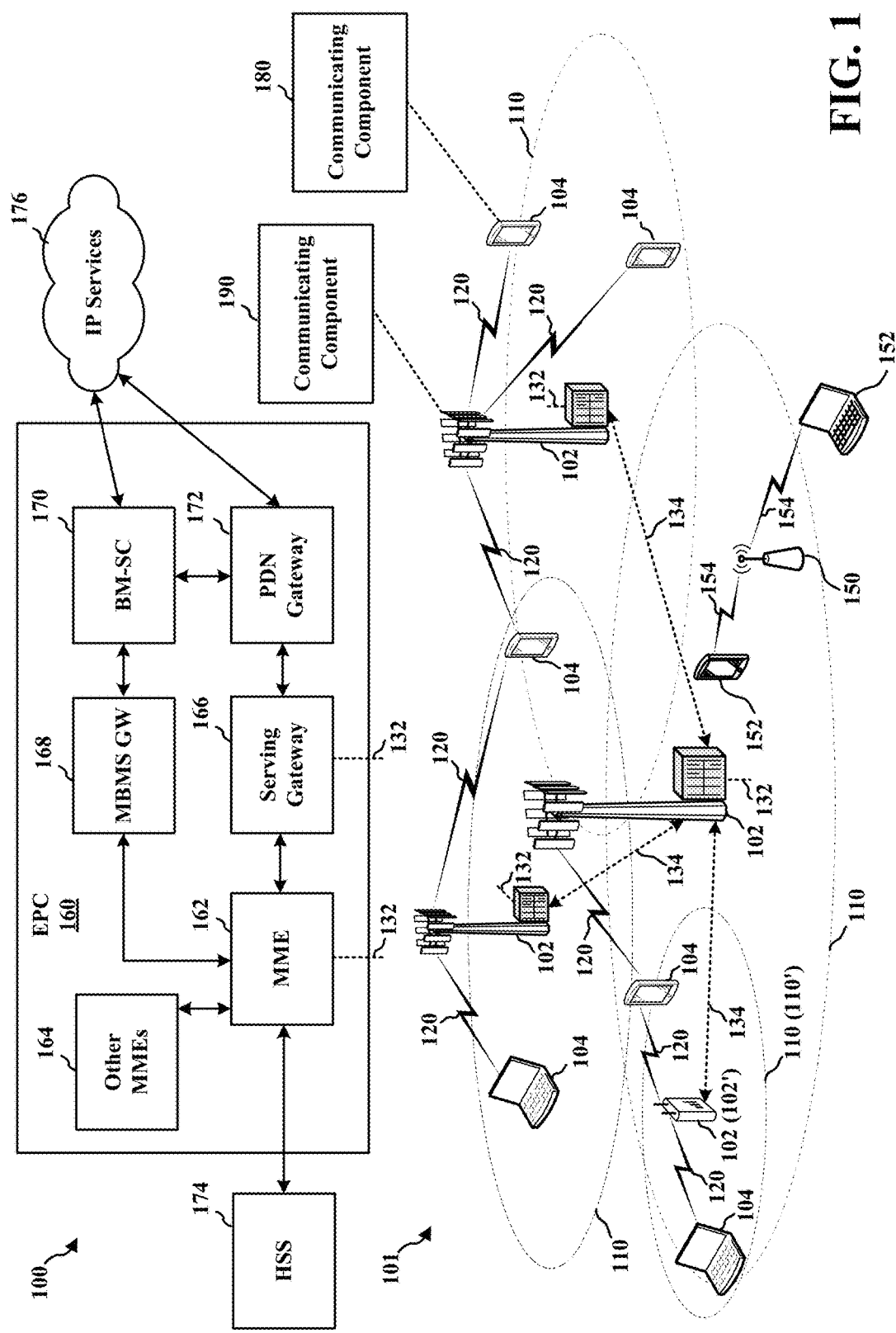
FIG. 1 is a schematic diagram illustrating an example of a wireless communications system and an access network in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present disclosure relates to techniques for selecting precoding schemes for uplink and/or downlink transmissions. For example, a user equipment (UE) may receive reference signal configuration information from a base station. The UE may configure one or more uplink antenna ports of the UE based on the received reference signal configuration information. The UE may transmit one or more reference signals to the base station on the one or more uplink antenna ports in accordance with the received reference signal configuration information. The UE may receive, uplink configuration for transmitting data signals over one or more data channels and/or transmitting control signals over one or more control channels. The UE may configure one or more uplink antenna ports of the UE based on the uplink configuration information. The UE may transmit one or more uplink signals on one or more data channels and/or the one or more control signals. The uplink configuration information may be based at least on the one or more reference signals transmitted to the base station. In an aspect, the base station can determine the uplink configuration independently of an indication indicating one or more preferred precoding schemes from the UE. In another aspect, the base station may determine the uplink configuration based at least on an indication indicating one or more preferred precoding schemes from the UE. However, when antennas of the UE have an imbalance (for example, a difference between the antennas in terms of signal strength), the base station may or may not be aware of such imbalances. For example, the antenna imbalance may occur due to external conditions such as, but not limited to, a user's handling of the UE (e.g., placement of a hand next to one of the antennas) and/or a presence of external structures (e.g., buildings) in an environment of the UE. For example, the external conditions may obstruct wireless communication through one or more antennas of the UE and cause certain beamforming directions of the one or more of the antennas of the UE to be less suitable for, e.g., uplink transmissions. With limited knowledge about such antenna imbalances, the base station may select a precoding scheme that is not optimal for uplink transmissions. For example, if the UE sends the SRS without any beamforming and using all antennas, the channel estimation at the base station may be inaccurate and thus, the base station may select a sub-optimal precoding scheme for uplink transmissions. If the multiple input multiple output (MIMO) channel between the UE and the base station is rank deficient, then sounding the channel on all the antennas may also be wasteful in terms of power. This may result in sub-optimal throughput performance and link efficiency.

The present disclosure describes various techniques for a base station selecting one or more precoding schemes for uplink and/or downlink transmissions with a UE without an indication of preferred precoding schemes from the UE. In an aspect, the base station may select one or more precoding scheme for uplink and/or downlink transmission with a UE with an indication of preferred precoding schemes from the UE which may be in light of possibly dynamic antenna imbalances. According to the present aspects, a UE may include a plurality of antennas (also interchangeably referred to herein as "antenna ports"). The UE may dynamically manage a set of uplink antennas ports based on its own measurement. For example, in an aspect, the UE may detect an antenna imbalance, blockage, and/or nearby obstacles. In an aspect, the UE may determine that certain precoding schemes would not work well for uplink transmissions over a channel based on the detection of the antenna imbalance, blockage, and/or nearby obstacles. Accordingly, in an aspect, the UE may explicitly transmit preference information for certain precoding schemes to a base station. For example, in an aspect, the UE may transmit a control signal including an indication of one or more preferred or non-preferred precoding matrices and/or one or more preferred or non-preferred antennas to an base station. In another aspect, the UE may implicitly transmit the preference information for certain precoding schemes to the base station. For example, in an aspect, the UE may transmit a reference signal by beamforming the reference signal using the one or more preferred precoding matrices and/or the one or more preferred antennas. In another aspect, the UE may implicitly transmit the preference information by allocating a larger proportion of transmit power to a preferred antenna than to a non-preferred antenna when transmitting the reference signal. In an aspect, the base station can make an informed selection of an uplink precoding matrix based on the control signal and/or reference signal received from the UE. In an aspect, for example, the control signal and/or reference signal can be used by the base station to decide how to pair users for multi-user MIMO transmissions for uplink.

In another aspect, the UE may dynamically manage the set of uplink antenna ports based on an indication received from the base station. For example, in an aspect, the base station can determine which antenna ports of the plurality of antenna ports to use for uplink transmissions based on one or more reference signals, one or more control signals and/or data signals received from the UE. Moreover, in another aspect, when the channel has uplink-downlink reciprocity, the base station can determine which antenna ports of the plurality of antenna ports to use for downlink transmissions based on the one or more reference signals, one or more control signals and/or data signals received from the UE. Additionally, or alternatively, in an aspect, the base station can determine which antenna ports to use for uplink and/or downlink transmissions based on, for example, an interference level from neighboring cells, a link budget of the UE, and/or feedback associated with one or more uplink scheduling grants transmitted by the base station to the UE. In an aspect, the base station can transmit a message to the UE indicating which antenna ports to use for the uplink and/or downlink transmissions. As a result, the UE can avoid transmitting uplink signals using blocked (or obstructed) antennas or blocked (or obstructed) beamforming directions, for example.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (see e.g., FIG. 1). Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Accordingly, in some aspects, the methods, apparatuses, and computer-readable medium described in the present disclosure may provide an efficient solution, as compared to conventional solutions, for selecting precoding schemes for uplink and/or downlink transmissions. For example, the present disclosure provides a solution that may improve throughput performance and link efficiency in wireless communication systems.

FIG. 1 is a diagram illustrating an example of a wireless communications system 100 including one or more access networks 101 and one or more UEs 104 communicating with one or more base stations 102. According to the present aspects, one or more base stations 102 may include a communicating component 190 (see FIG. 4) configured to select an optimal precoding matrix for uplink and/or downlink transmissions, as described herein. In addition, according to the present aspects, one or more UEs 104 may include a communicating component 180 (see FIG. 4) configured to detect an antenna imbalance and to assist in the selection of the optimal precoding matrix for uplink and/or downlink transmissions, as described herein.

Additionally, the wireless communications system 100 (also referred to as a wireless wide area network (WWAN)) includes an Evolved Packet Core (EPC) 160 that communicatively couples the one or more access networks 101 with other devices and/or networks, including IP services 176. The base stations 102 may include macro cells (high power cellular base station) and/or small cells (low power cellular base station). The macro cells include base stations. The small cells include femtocells, picocells, and microcells, any of which may be referred to as Home eNBs or simply an eNB.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of the one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include an uplink (UL) (also referred to as reverse link) transmissions from a UE 104 to a base station 102 and/or a downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carriers. The base stations 102/UEs 104 may use spectrum up to Y MHz (e.g., where Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier (PCC) and one or more secondary component carriers (SCCs). A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) or Listen Before Talk (LBT) functionality prior to communicating in order to determine whether the channel is available (e.g., generally, to avoid transmitting on a channel where another transmission is occurring, which would cause interference).

The small cell 102' may operate in a licensed and/or an unlicensed frequency spectrum. When operating in an unlicensed frequency spectrum, the small cell 102' may employ Long Term Evolution (LTE) and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire (when in a standalone unlicensed spectrum operation). The unlicensed frequency spectrum may also be referred to as a shared frequency spectrum.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is communicatively coupled with the PDN Gateway 172. The PDN Gateway 172 provides UE IP address allocation as well as other functions. The PDN Gateway 172 and the BM-SC 170 are communicatively coupled with the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a DL frame structure, which may be utilized for 5G communications between the wireless communication devices of FIG. 1, e.g., by one or more of base stations 102 or 102', UEs 104, APs 150, and/or STAs 152. FIG. 2B is a diagram 230 illustrating an example of channels within the DL frame structure, which may be utilized for 5G communications between the wireless communication devices of FIG. 1. FIG. 2C is a diagram 250 illustrating an example of an UL frame structure, which may be utilized for 5G communications between the wireless communication devices of FIG. 1. FIG. 2D is a diagram 280 illustrating an example of channels within the UL frame structure, which may be utilized for 5G communications between the wireless communication devices of FIG. 1. Each of the frame structures in FIGS. 2A-2D may be used in LTE communications and in extensions of LTE communications for 5G. Other wireless communication technologies may have a different frame structure and/or different channels. In LTE, a frame (10 ms) may be divided into ten (10) equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains twelve (12) consecutive subcarriers in the frequency domain and seven (7) consecutive symbols (for DL, OFDM symbols; for UL, SC-FDMA symbols) in the time domain, for a total of eighty-four (84) REs. For an extended cyclic prefix, an RB contains twelve (12) consecutive subcarriers in the frequency domain and six (6) consecutive symbols in the time domain, for a total of seventy-two (72) REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

Diagram 230 in FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine (9) RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

Diagram 280 in FIG. 2D illustrates an example of various channels within an UL subframe of a frame. A physical random access channel (PRACH) may be within one or more subframes within a frame based on the PRACH configuration. The PRACH may include six (6) consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
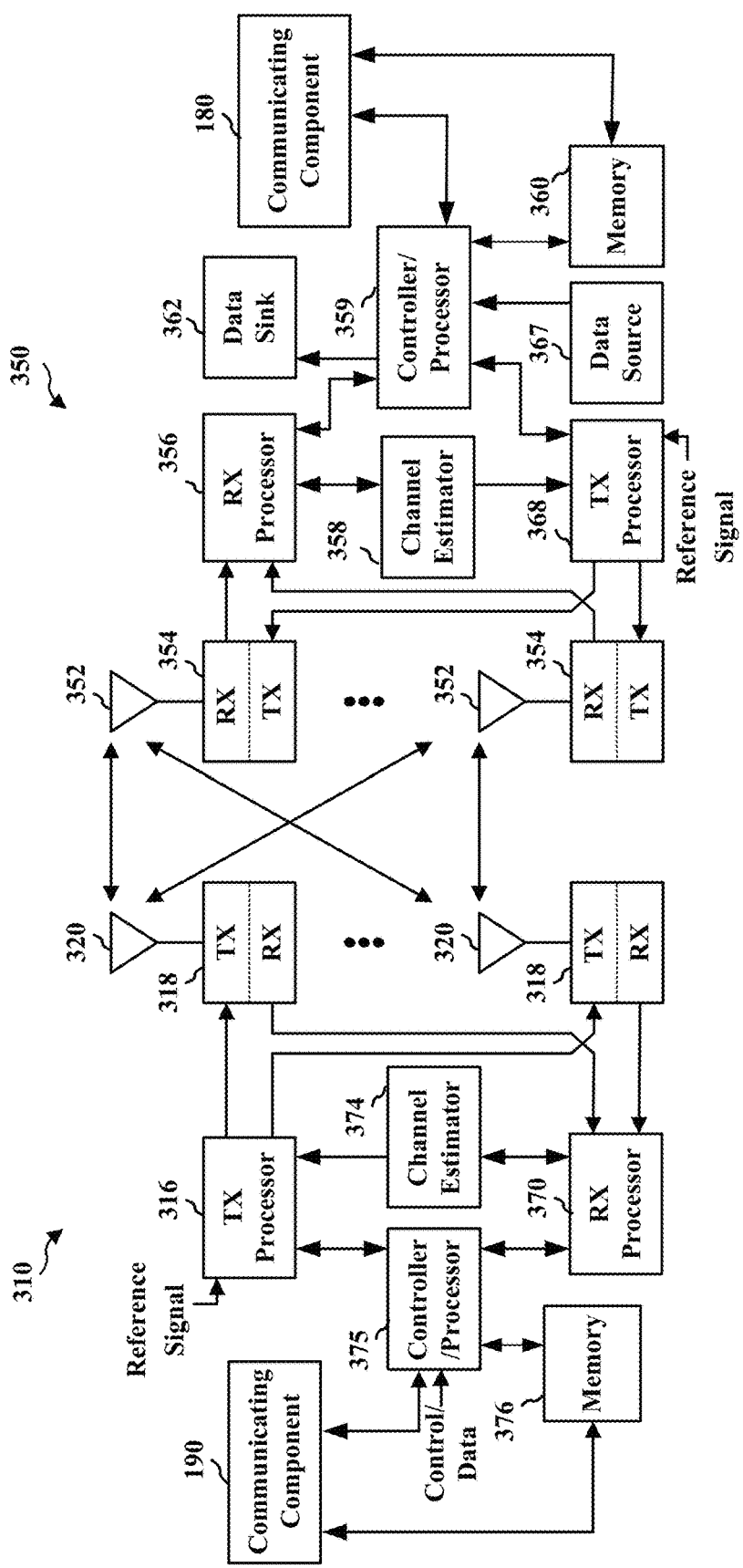
FIG. 3 is a diagram illustrating an example of a base station and user equipment (UE) in an access network in accordance with various aspects of the present disclosure.

FIG. 3 is a block diagram of a base station 310 in communication with a UE 350 in an access network, where the base station 310 may be an example of base stations 102 or 102' and/or APs 150 of FIG. 1, and UE 350 may be an example of UEs 104 and/or STAs 152 of FIG. 1. In an aspect, communicating component 190 may be a part of the base station 310, such as implemented within the controller/processor 375 and/or memory 376. As described herein, the communicating component 190 may be configured to select an optimal precoding matrix for uplink and/or downlink communications. Similarly, in an aspect, the communicating component 180 may be a part of the UE 350, such as implemented within controller/processor 359 and/or memory 360. As described herein, the communicating component 180 may be configured to detect an imbalance between one or more antennas of the UE 350 and to assist the base station 310 with the selection of the optimal precoding scheme for uplink and/or downlink transmissions. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Referring to FIG. 4A, in an example of a wireless communication system 400 similar to system 100, the UE 104 may wirelessly communicate with the base station 102 via one or more antennas 458 (corresponding to, e.g., antennas 352 in FIG. 3). In an aspect, each antenna 458 may be configured to operate in a high frequency band such as, but not limited to, millimeter wave. For example, in an aspect, each antenna 458 may be configured to produce a beam with a narrow beamwidth. Additionally, each antenna 458 may configured to steer the beam in a plurality of directions. However, an imbalance between each of the antennas 458 may occur due to external conditions. For example, certain beamforming directions may be blocked by one or more obstacles 430 (e.g., buildings) in an environment of the UE 104. Accordingly, when an antenna 458 transmits a signal in a direction blocked by obstacle 430, the received signal strength (e.g., signal-to-noise ratio) of the signal may be reduced. However, a different antenna 458 may be configured to transmit a signal in another direction that is not blocked by the obstacle 430 and thus, the received signal strength of this signal may not be reduced. As a result, there may be an imbalance in terms of signal strength between each of the antennas 458. Additionally, or alternatively, an antenna 458 may be blocked by the placement of a hand 432 next to the antenna 458, while a different antenna located at a different position on the UE 104 may not be blocked by the placement of the same hand 432. As a result, there may be an imbalance between the different antennas 458. For example, the received signal strength of the blocked antenna 458 may be lower than the received signal strength of the antenna 458 that is not blocked.

Figure 4B:
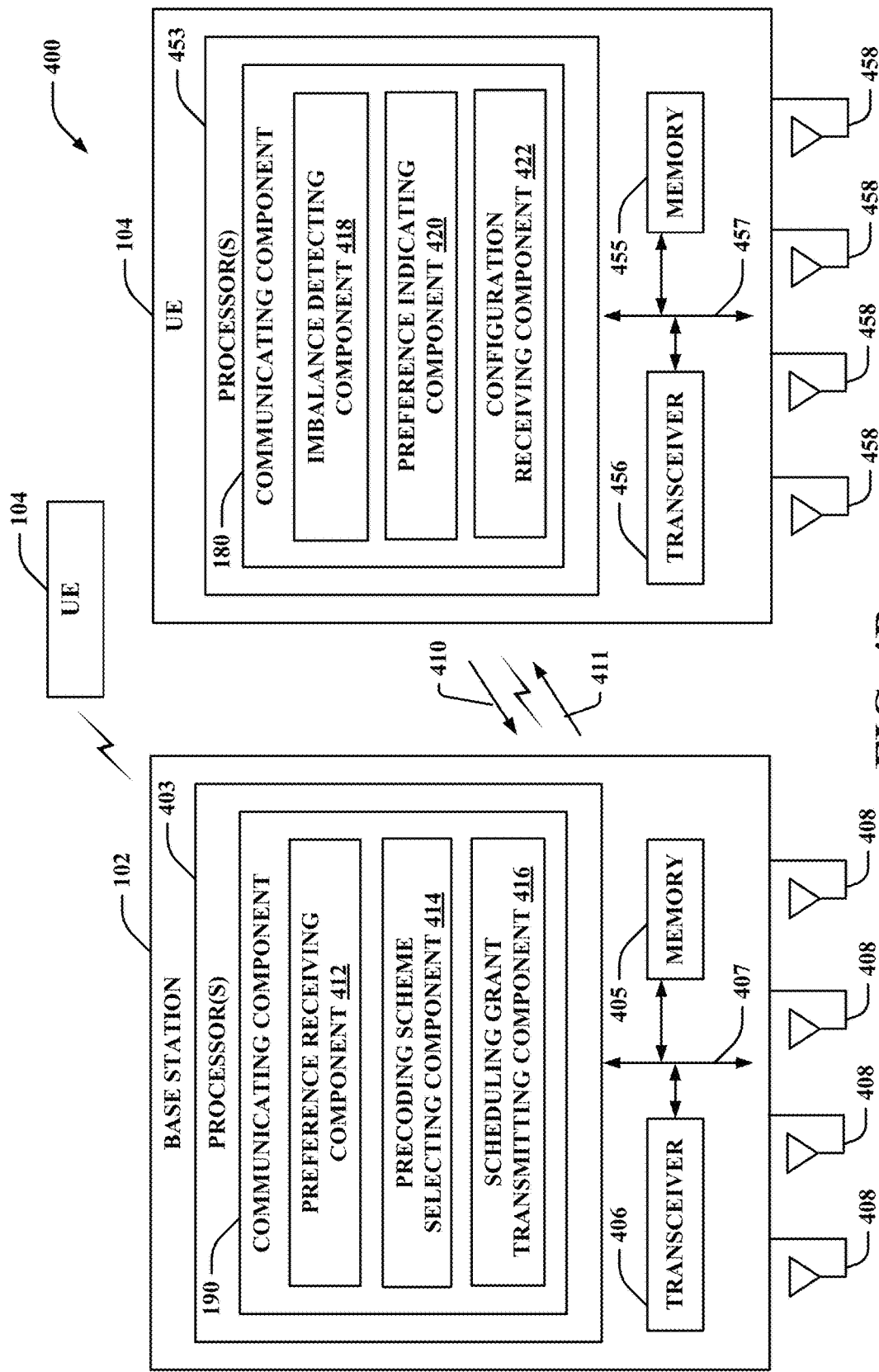
FIG. 4B is a second diagram illustrating an example of a wireless communication system for dynamic antenna port management, in accordance with various aspects of the present disclosure.

Referring to FIG. 4B, in an example of the wireless communication system 400 similar to system 100, more detailed examples of the UE 104 and the base station 102 may each include additional system components in one example implementation of dynamic uplink antenna port management.

In particular, the wireless communication system 400 includes the UE 104 that communicates with the base station 102 to access a wireless network, examples of which are described in FIGS. 1, 3, etc., above. In particular, the UE 104 can communicate with a wireless network (e.g., EPC 160 and/or IP Services 176) via the base station 102. In an aspect, the base station 102 and the UE 104 may have established one or more downlink channels over which downlink signals 411 can be transmitted by the base station 102 (e.g., via a transceiver 406) and received by the UE 104 (e.g., via a transceiver 456) for communicating control and/or data messages (e.g., signaling) from the base station 102 to the UE 104 over configured communication resources. Moreover, for example, the base station 102 and the UE 104 may have established one or more uplink channels over which uplink signals 410 can be transmitted by the UE 104 (e.g., via the transceiver 456) and received by the base station 102 (e.g., via the transceiver 406) for communicating control and/or data messages (e.g., signaling) from the UE 104 to the base station 102 over configured communication resources.

In accordance with the present disclosure, the UE 104 may include at least one memory 455 and one or more processors 453 that may be communicatively coupled, e.g., via one or more buses 457, and may operate in conjunction with or otherwise implement communicating component 180 for detecting an antenna imbalance and assisting in the selection of an optimal precoding scheme for uplink and/or downlink transmissions, as described herein. For example, the various operations related to the communicating component 180 or its subcomponents may be implemented or otherwise executed by one or more processors 453 and, in an aspect, can be executed by a single processor, while in other aspects, different ones of the operations may be executed by a combination of two or more different processors. For example, in an aspect, the one or more processors 453 may include any one or any combination of a modem processor, or a baseband processor, or a digital signal processor, or an application specific integrated circuit (ASIC), or a transmit processor, receive processor, or a transceiver processor associated with the transceiver 456. Further, for example, the memory 455 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 453. Moreover, the memory 455 or computer-readable storage medium may be resident in the one or more processors 453, external to the one or more processors 453, distributed across multiple entities including the one or more processors 453, etc.

Similarly, in an aspect, the base station 102 may include one or more processors 403 and/or a memory 405 that may be communicatively coupled, e.g., via one or more buses 407, and may operate in conjunction with or otherwise implement a communicating component 190 for selecting an optimal precoding matrix for uplink and/or downlink transmissions, as described herein. For example, the various functions related to the communicating component 190 or subcomponents of the communicating component 190 may be implemented or otherwise executed by one or more processors 403 and, in an aspect, can be executed by a single processor, while in other aspects, different ones of the functions may be executed by a combination of two or more different processors, as described above. In one example, the one or more processors 403 and/or memory 405 may be configured as described in examples above with respect to the one or more processors 453 and/or memory 455 of UE 104.

The transceivers 406, 456 may be configured to transmit and receive wireless signals through one or more antennas 408, 458, an RF front end, one or more transmitters, and one or more receivers. In an aspect, the transceivers 406, 456 may be tuned to operate at specified frequencies such that the UE 104 and/or the base station 102 can communicate at a certain frequency. In an aspect, the one or more processors 403 may configure the transceiver 406 and/or the one or more processors 453 may configure the transceiver 456 to operate at a specified frequency and power level based on a configuration, a communication protocol, etc. to communicate the uplink signals 410 and/or the downlink signals 411, respectively, over related uplink or downlink communication channels.

In an aspect, the transceivers 406, 456 can operate in multiple bands (e.g., using a multiband-multimode modem, not shown) such to process digital data sent and received using the transceivers 406, 456. In an aspect, the transceivers 406, 456 can be multiband and be configured to support multiple frequency bands for a specific communications protocol. In an aspect, the transceivers 406, 456 can be configured to support multiple operating networks and communications protocols. Thus, for example, the transceivers 406, 456 may enable transmission and/or reception of signals based on a specified modem configuration.

According to the present aspects, communicating component 190 of the base station 102 may include a preference receiving component 412 for receiving an indication of one or more preferred or non-preferred uplink precoding schemes of the UE 104, a precoding scheme selecting component 414 for selecting a precoding scheme based at least in part on the received indication or for selecting a precoding scheme that is based independently of a received indication (whether received or not), and a scheduling grant transmitting component 416 for transmitting a scheduling grant including the selected precoding scheme to the UE 104. The preference receiving component 412, precoding scheme selecting component 414, and scheduling grant transmitting component 416 may each be implemented as a hardware component separate from other hardware components in the communicating component 190, or may each be implemented as a combination of hardware and software using the processors 403 and the memory 405, or may each be implemented as software or firmware executing or operating on the processors 403 based on instructions stored on the memory 405.

In addition, according to the present aspects, the communicating component 180 of the UE 104 may include an imbalance detecting component 418 for detecting a gain imbalance between a plurality of antennas 458 of the UE 104, a preference indicating component 420 for transmitting the indication of the one more preferred or non-preferred uplink precoding schemes, and a configuration receiving component 422 for receiving the scheduling grant including the precoding scheme. In an aspect, the configuration receiving component 422 can receive configuration information (e.g., reference signal configuration information and/or uplink configuration information) via a radio resource configuration (RRC) message. The RRC message can be received when there is no scheduling grant or in addition to a scheduling grant. The imbalance detecting component 418, preference indicating component 420, and configuration receiving component 422 may each be implemented as a hardware component separate from other hardware components in the communicating component 180, or may each be implemented as a combination of hardware and software using the processors 453 and the memory 455, or may each be implemented as software or firmware executing or operating on the processors 453 based on instructions stored on the memory 455.

Figure 5:
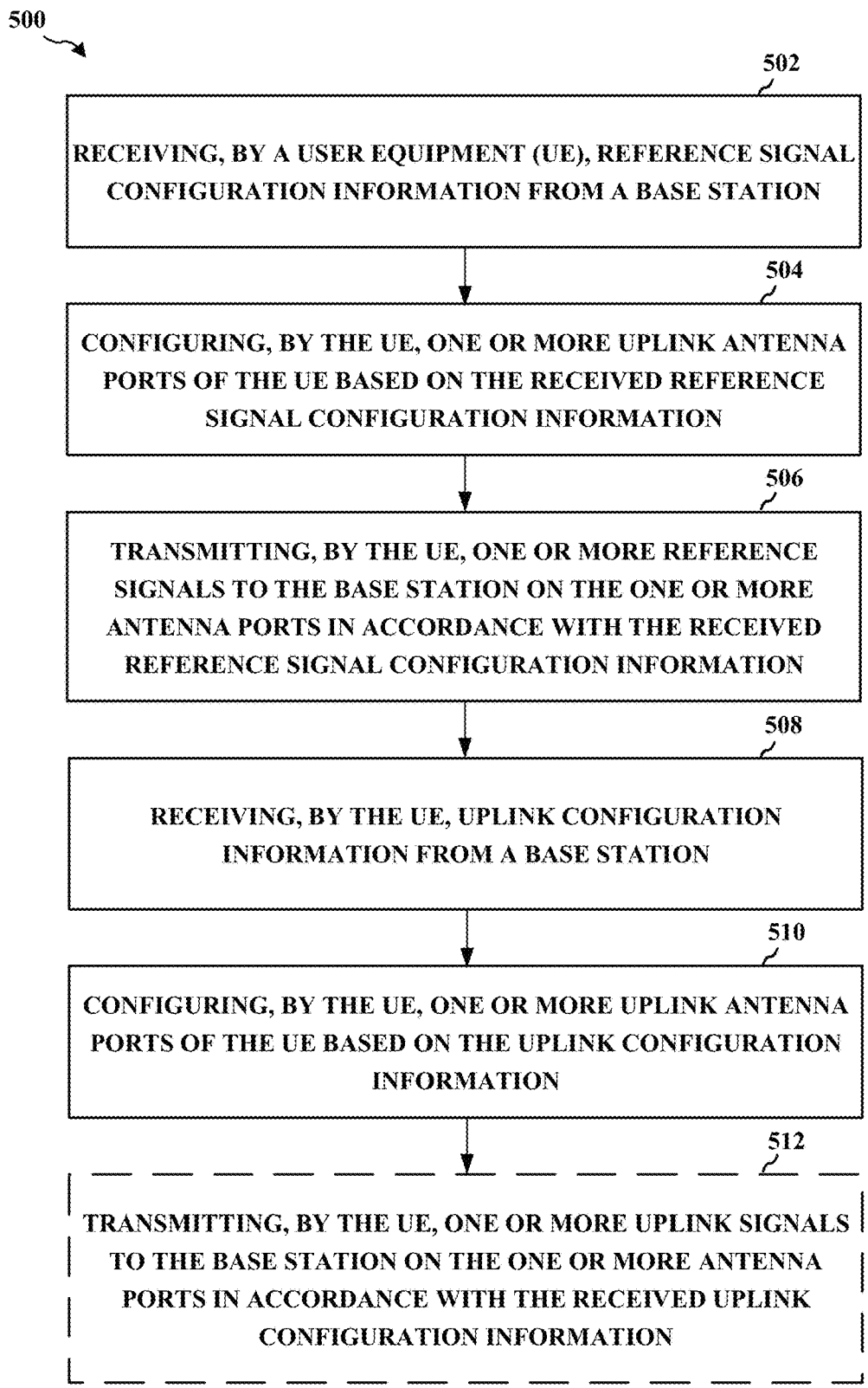
FIG. 5 is a diagram illustrating a first example method for configuring uplink transmissions in accordance with various aspects of the present disclosure.

FIG. 5 illustrates a method 500 for configuring uplink transmissions in accordance with a first embodiment. In an aspect, method 500 may include, at block 502, receiving, by a UE 104, reference signal configuration information from a base station 102. For example, in an aspect, the configuration receiving component 422 (e.g., in conjunction with the memory 455 and/or the processor(s) 453) may receive the reference signal configuration information. For example, in an aspect, the reference signal configuration information may include one or more preferred precoding schemes. For example, in an aspect, the reference signal configuration information may include an indication of one or more preferred precoding matrices (e.g., preferred or non-preferred) and/or an indication of one or more preferred antenna ports 458 (e.g., preferred or non-preferred) for transmitting one or more reference signals to the base station 102. In an aspect, the base station 102 may select the one or more precoding schemes for the one or more reference signals independently of one or more preferred precoding schemes preferred by the UE 104. Additionally, alternatively, as will be described herein (e.g., FIG. 9), the base station 102 may select the one or more precoding schemes for the one or more reference signals based at least in part on one or more preferred precoding schemes provided by the UE 104.

Method 500 may include, at block 504, configuring, by the UE 104, one or more uplink antenna ports of the UE based on the received reference signal configuration information. For example, in an aspect, the communicating component 180 and/or the one or more processors 403 may configure the transceiver 456 to operate at a specified frequency and power level based on the received reference signal configuration information to communicate one or more uplink reference signals in accordance with the received reference signal configuration information. The one or more uplink reference signals may be transmitted over one or more uplink communication channels. For example, in an aspect, the one or more processors 403 may configure or manage a set of uplink antenna ports 458 based on an indication from the base station 102 including one or more precoding schemes to use for one or more uplink transmissions such as, but not limited to, a SRS transmission (see FIG. 2C). For example, in an aspect, the UE 104 may receive an indication from the base station 102 including a number of antenna ports 458 and/or precoding matrix to use for SRS and this indication may change, e.g., semi-statically or dynamically. For example, in an aspect, the UE 104 may transmit one or more SRS(s) based on a semi-static number of antennas ports 458 (e.g., eight ports) in accordance with one or more precoding schemes. For example, in an aspect, the UE may transmit one or more SRS(s) based on a dynamic number of antenna ports 458 in accordance with one or more precoding schemes. For example, the UE 104 may be configured with eight uplink antenna ports 458, but only four (4) of the uplink antenna ports 458 may be enabled during a first transmission time interval ("t1"), while six (6) of the uplink antenna ports 458 may be enabled during a second transmission time interval ("t2").

Method 500 may include, at block 506, transmitting, by the UE 104, one or more reference signals to the base station 102 on the one or more uplink antenna ports in accordance with the received reference signal configuration information. In an aspect, for example, the communicating component 180 and/or the one or more processors 403 cause the transceiver 456 to transmit one or more uplink reference signals in accordance with the received reference signal configuration information over one or more uplink communication channels.

Method 500 may include, at block 508, receiving, by the UE 104, uplink configuration information for at least one of one or more data channels and one or more control channels. For example, in an aspect, the configuration receiving component 422 (e.g., in conjunction with the memory 455 and/or the processor(s) 453) may receive the uplink configuration information for uplink transmissions. The uplink configuration information may include one or more precoding schemes to configure one or more uplink antenna port 458 of the UE 104 to transmit data over one or more data channels (e.g., PUSCH) and/or to transmit control information over one or more control channels (e.g., PUCCH). For example, in an aspect, the uplink configuration information may include an indication of one or more preferred precoding matrices (e.g., preferred or non-preferred) and/or an indication of one or more preferred antenna ports 458 (e.g., preferred or non-preferred) for transmitting data and/or control information to the base station 102. The uplink configuration information may be based on the one or more reference signals received from the UE 104. In an aspect, the base station 102 may select one or more precoding schemes for transmitting data and/or control information independently of one or more preferred precoding schemes for transmitting data and/or control information preferred by the UE 104. Additionally, or alternatively, as will be described herein (e.g., FIG. 9), the base station 102 may select one or more precoding schemes for transmitting data and/or control information to the base station 102 based at least in part on one or more preferred precoding schemes preferred by the UE 104.

Method 500 may include, at block 510, configure, by the UE 104, one or more uplink antenna ports of the UE 104 based on the uplink configuration information. For example, in an aspect, the communicating component 180 and/or the one or more processors 403 may configure the transceiver 456 to operate at a specified frequency and power level based on the uplink configuration information to communicate uplink signals (e.g., data and/or control information) in accordance with the received uplink configuration information over one or more data communication channels (e.g., PUSCH) and/or one or more control communication channels (e.g., PUCCH). For example, in an aspect, the communicating component 180 and/or the one or more processors 403 may dynamically manage a set of uplink antenna ports 458 based on an indication from the base station 102 including one or more precoding schemes to use for uplink transmissions such as, but not limited to, data transmission (see FIG. 2D) and/or control transmission (see FIG. 2E). For example, in an aspect, the UE 104 may transmit uplink transmissions according to the one or more precoding schemes included in the indication from the base station 102. In an aspect, the antenna ports 458 used by the UE 104 for uplink transmissions may be based on one or more precoding schemes received in the indication from the base station 102. For example, the UE 104 may be configured with eight uplink antenna ports 458, but only four (4) of the uplink antenna ports 458 may be enabled during a first transmission time interval ("t1"), while six (6) of the uplink antenna ports 458 may be enabled during a second transmission time interval ("t2"). For example, in an aspect, the UE 104 may transmit a data and/or control information based on a semi-static number of antennas ports 458 (e.g., eight ports).

Method 500 may include optionally, at block 512, transmitting, by the UE 104, one or more uplink signals to the base station 102 on the one or more uplink antenna ports in accordance with the received uplink configuration information. In an aspect, for example, the communicating component 180 and/or the one or more processors 403 may cause the transceiver 456 to transmit one or more the uplink signals in accordance with the received uplink configuration information over one or more uplink communication channels. For example, in an aspect, the communicating component 180 and/or the one or more processors 403 may dynamically manage a set of uplink antenna ports 458 based on an indication from the base station 102 including one or more precoding schemes to use for uplink transmissions such as, but not limited to, data transmission (see FIG. 2D) and/or control transmission (see FIG. 2E). For example, in an aspect, the UE 104 may transmit uplink transmissions according to the precoding scheme included in the indication from the base station 102. In an aspect, the antenna ports 458 used by the UE 104 for uplink transmissions may be based on the precoding scheme received in the indication from the base station 102. For example, the UE 104 may be configured with eight uplink antenna ports 458, but only four (4) of the uplink antenna ports 458 may be enabled during a first transmission time interval ("t1"), while six (6) of the uplink antenna ports 458 may be enabled during a second transmission time interval ("t2"). For example, in an aspect, the UE 104 may receive an indication from the base station 102 including a number of antenna ports 458 and/or precoding matrix to use for control signals and/or data signals and this indication may change, e.g., dynamically or semi-statically. For example, in an aspect, the UE 104 may transmit uplink signals based on a semi-static number of antennas ports 458 (e.g., eight ports).

Figure 6:
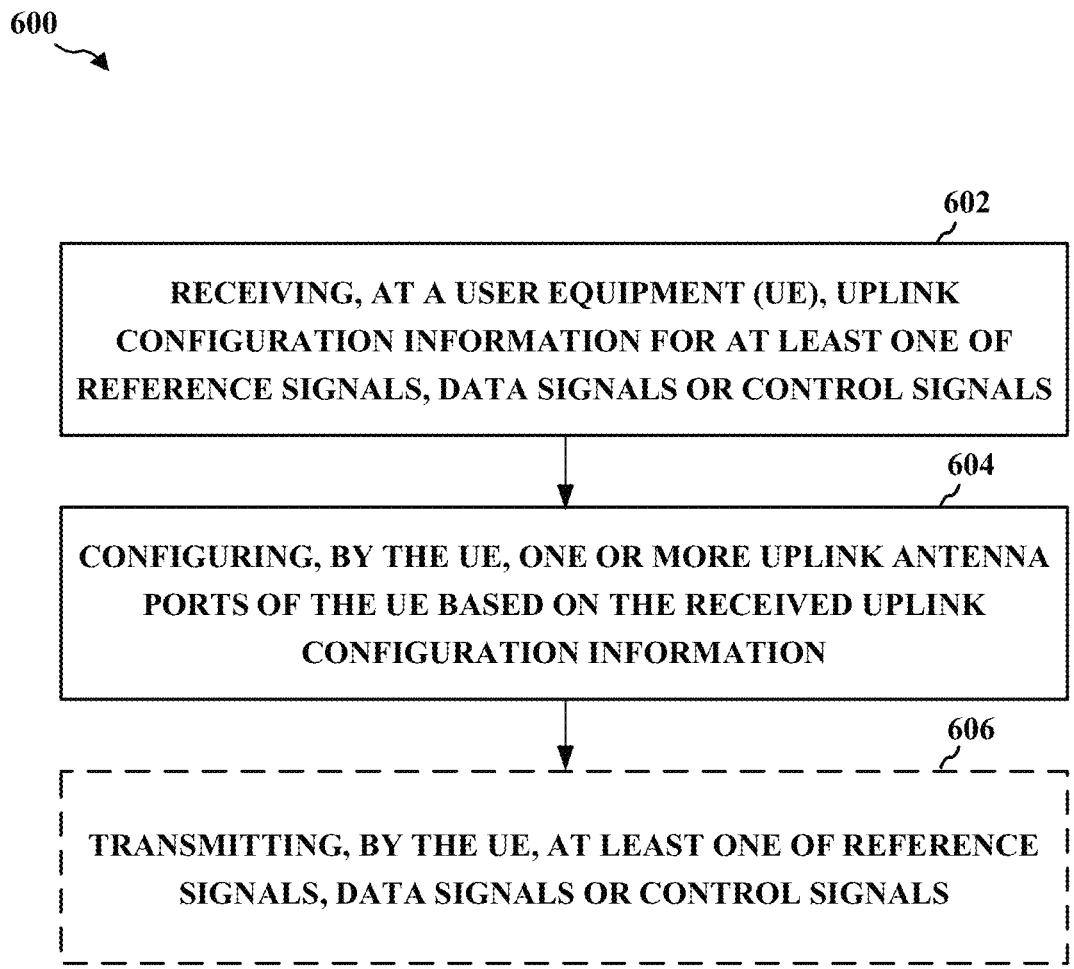
FIG. 6 is a diagram illustrating a second example method for configuring uplink transmissions in accordance with various aspects of the present disclosure.

FIG. 6 illustrates a method 600 for configuring uplink transmissions in accordance with a second embodiment. In an aspect, method 600 may include, at block 602, receiving, by the UE 104, uplink configuration information for at least one of references signals over one or more uplink channels, data signals over one or more data channels (e.g., PUSCH) and control signals over one or more control channels (PUCCH). For example, in an aspect, the configuration receiving component 422 (e.g., in conjunction with the memory 455 and/or the processor(s) 453) may receive the uplink configuration information for configuring one or more uplink antenna port of the UE 104. For example, in an aspect, the uplink configuration information may include an indication of one or more preferred precoding matrices (e.g., preferred or non-preferred) and/or an indication of one or more preferred antenna ports 458 (e.g., preferred or non-preferred) for transmitting one or more reference signals, data signals and/or control signals to the base station 102. In an aspect, the base station 102 may select the one or more precoding schemes for transmitting the one or more reference signals, one or more data signals and/or one or more control signals to the base station 102. Additionally, or alternatively, as will be described herein (e.g., FIG. 9), the base station 102 may select the one or more precoding schemes for transmitting one or more reference signals, one or more data signals and/or one or more control signals to the base station 102 based at least in part one or more preferred precoding schemes preferred by the UE 104.

Method 600 may include, at block 604, configuring, by the UE, the one or more uplink antenna ports of the UE based on the received uplink configuration information. For example, in an aspect, the communicating component 180 and/or the one or more processors 403 may configure the transceiver 456 to operate at a specified frequency and power level based on the uplink signal configuration information to communicate references signals over one or more uplink channels, data signals over one or more data channels (e.g., PUSCH) and/or control signals over one or more control channels (PUCCH). For example, in an aspect, the communicating component 180 and/or the one or more processors 403 may configure or manage a set of uplink antenna ports 458 based on an indication from the base station 102 including one or more precoding schemes to use for one or more uplink transmissions such as, but not limited to, one or more SRS transmissions (see FIG. 2C), one or more data transmissions (see FIG. 2D) or one or more control transmissions (see FIG. 2E). For example, in an aspect, the UE 104 may receive an indication from the base station 102 including a number of antenna ports 458 and/or one or more precoding schemes to use for one or more SRS transmissions, one or more data transmissions or one or more control transmissions, and this indication may change, e.g., semi-statically or dynamically. For example, in an aspect, the UE 104 may transmit one or more transmissions based on a semi-static number of antennas ports 458 (e.g., eight ports) in accordance with one or more precoding schemes. For example, in an aspect, the UE may transmit one or more SRS(s) based on a dynamic number of antenna ports 458 in accordance with one or more precoding schemes. For example, the UE 104 may be configured with eight uplink antenna ports 458, but only four (4) of the uplink antenna ports 458 may be enabled during a first transmission time interval ("t1"), while six (6) of the uplink antenna ports 458 may be enabled during a second transmission time interval ("t2").

Method 600 may include optionally, at block 606, transmitting, by the UE 104, at least one of references signals over one or more uplink channels, data signals over one or more data channels (e.g., PUSCH) or control signals over one or more control channels (PUCCH) to the base station 102 on the one or more uplink antenna ports in accordance with the uplink signal configuration information. In an aspect, for example, the communicating component 180 and/or the one or more processors 403 may cause the transceiver 456 to transmit at least one of references signals over one or more uplink channels, data signals over one or more data channels (e.g., PUSCH) or control signals over one or more control channels (PUCCH) to the base station 102 on the one or more uplink antenna ports 458 in accordance with the uplink signal configuration information.

Figure 7:
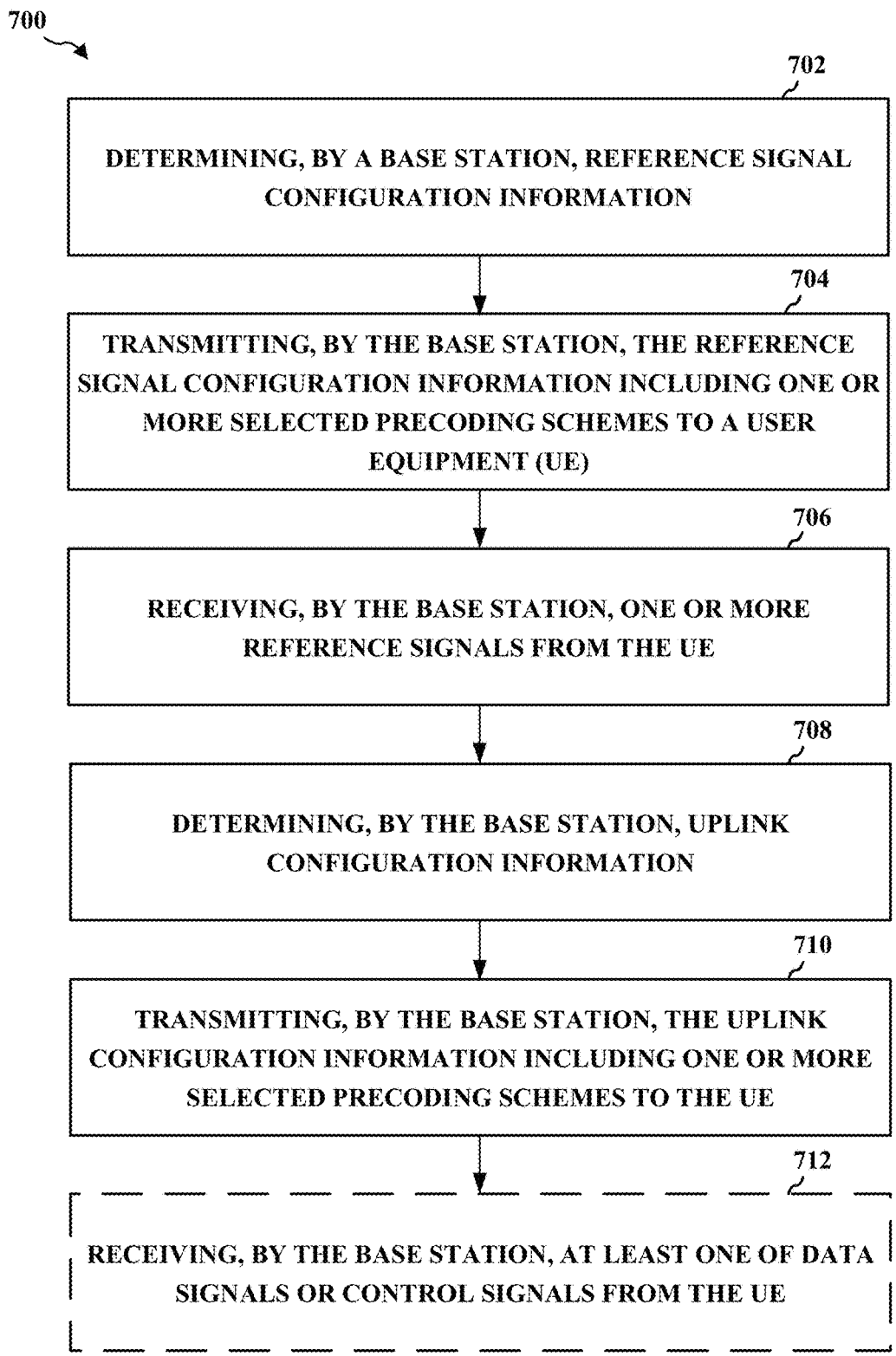
FIG. 7 is a diagram illustrating a first example method for determining one or more precoding schemes by a base station in accordance with various aspects of the present disclosure.

FIG. 7 illustrates a method 700 for determining one or more precoding schemes by a base station in accordance with a first embodiment. In an aspect, method 700 may include, at block 702, determining, by the base station 102, reference signal configuration information. For example, in an aspect, the precoding scheme selecting component 414 (e.g., in conjunction with the memory 405 and/or the processor(s) 406) may determine reference signal configuration information for one or more reference signals. The reference signal configuration information may be by the UE 104 to configure one or more uplink antenna port 458 of the UE 104. For example, in an aspect, the reference signal configuration information may include one or more preferred precoding schemes. For example, in an aspect, the reference signal configuration information may include an indication of one or more preferred precoding matrices (e.g., preferred or non-preferred) and/or an indication of one or more preferred antenna ports 458 (e.g., preferred or non-preferred) for transmitting one or more reference signals to the base station 102. In an aspect, the base station 102 may select the one or more precoding schemes for the one or more reference signals independently of one or more preferred precoding schemes preferred by the UE 104. Additionally, alternatively, as will be described herein (e.g., FIG. 9), the base station 102 may select the one or more precoding schemes for the one or more reference signals based at least in part on one or more preferred precoding schemes preferred by the UE 104.

Additionally, or alternatively, in an aspect, the precoding scheme selecting component 414 may choose to select a precoding scheme for the reference signal configuration information based on one or more other performance impact factors such as, but not limited to, at least one of interference from a neighboring cell, historical feedback information or a link budget of the UE 104. For example, in an aspect, the precoding scheme selecting component 414 may identify feedback information stored in, e.g., the memory 405. For example, the precoding scheme selecting component 414 may identify feedback (e.g., ACK or NACK) information related to one or more scheduling grants previously transmitted by the base station 102 to the at least one UE 104. For example, in an aspect, the precoding scheme selecting component 414 may select the precoding scheme based on a link budget of the UE 104. For example, in an aspect, the precoding scheme selecting component 414 may determine that the at least one UE 104 is positioned at or near an edge of a serving cell of the base station 102. In this case, the precoding scheme selecting component 414 may choose to select only a small number of (e.g., one or two) uplink antenna ports 458. Thus, according to the present aspects, the precoding scheme selecting component 414 may make an informed selection of the precoding scheme for reference signal transmissions.

Method 700 may include, at block 704, transmitting, by the base station 102, the reference signal configuration information including the one or more selected precoding schemes to the UE 104. In an aspect, for example, the scheduling grant transmitting component 416 may (e.g., in conjunction the memory 405 and/or the processor(s) 403) transmit the reference signal configuration information including the one or more selected precoding schemes to the UE 104. For example, in an aspect, the reference signal configuration information can include one or more preferred precoding schemes. For example, in an aspect, the reference signal configuration information can include an indication of one or more preferred precoding matrices (e.g., preferred or non-preferred) and/or an indication of one or more preferred antenna ports 458 (e.g., preferred or non-preferred) for transmitting one or more reference signals to the base station 102.

Method 700 may include, at block 706, receiving, by the base station 102, one or more reference signals from the UE 104. For example, in an aspect, the transceiver 406 (in conjunction with the preference receiving component 412 and/or processor(s) 190), may receive one or more reference signals transmitted by the UE 104. The UE 104 transmits at least one of one or more of reference signals in accordance with the reference signal configuration information that the base station 102 transmitted to the UE 104.

Method 700 may include, at block 708, determining, by the base station 102, uplink configuration information. For example, in an aspect, the precoding scheme selecting component 414 (e.g., in conjunction with the memory 405 and/or the processor(s) 406) may configure uplink configuration information for one or more reference signals. The uplink configuration information may include one or more precoding schemes to configure one or more uplink antenna port 458 of the UE 104 to transmit data over one or more data channels (e.g., PUSCH) and/or to transmit control information over one or more control channels (e.g., PUCCH). For example, in an aspect, the uplink configuration information may include an indication of one or more preferred precoding matrices (e.g., preferred or non-preferred) and/or an indication of one or more preferred antenna ports 458 (e.g., preferred or non-preferred) for transmitting data and/or control information to the base station 102. The uplink configuration information may be based on the one or more reference signals received from the UE 104. In an aspect, the base station 102 may select one or more precoding schemes for transmitting data and/or control information independently of one or more preferred precoding schemes for transmitting data and/or control information preferred by the UE 104. Additionally, or alternatively, as will be described herein (e.g., FIG. 9), the base station 102 may select one or more precoding schemes for transmitting data and/or control information to the base station 102 based at least in part on one or more preferred precoding schemes preferred by the UE 104.

Additionally, or alternatively, in an aspect, the precoding scheme selecting component 414 may choose to select a precoding scheme for the uplink configuration information based on one or more other performance impact factors performance impact factors such as, but not limited to, at least one of interference from a neighboring cell, historical feedback information or a link budget of the UE 104. For example, in an aspect, the precoding scheme selecting component 414 may identify feedback information stored in, e.g., the memory 405. For example, the precoding scheme selecting component 414 may identify feedback (e.g., ACK or NACK) information related to one or more scheduling grants previously transmitted by the base station 102 to the at least one UE 104. In an aspect, for example, the precoding scheme selecting component 414 may choose not to select a precoding scheme that was previously rejected or otherwise not accepted by the at least one UE 104. For example, in an aspect, the precoding scheme selecting component 414 may select the precoding scheme based on a link budget of the UE 104. For example, in an aspect, the precoding scheme selecting component 414 may determine that the at least one UE 104 is positioned at or near an edge of a serving cell of the base station 102. In this case, the precoding scheme selecting component 414 may choose to select only a small number of (e.g., one or two) uplink antenna ports 458. Thus, according to the present aspects, the precoding scheme selecting component 414 may make an informed selection of the precoding scheme for reference signal transmissions.

Method 700 may include, at block 710, transmitting, by the base station 102, the uplink configuration information including the one or more selected precoding schemes to the UE 104. In an aspect, for example, the scheduling grant transmitting component 416 may (e.g., in conjunction the memory 405 and/or the processor(s) 403) transmit the uplink configuration information including the one or more selected precoding schemes to the UE 104. For example, in an aspect, the uplink configuration information can include an indication of one or more preferred precoding matrices (e.g., preferred or non-preferred) and/or an indication of one or more preferred antenna ports 458 (e.g., preferred or non-preferred) for transmitting data signals over one or more data channels (e.g., PUSCH) and/or to transmitting control signals over one or more control channels (e.g., PUCCH) to the base station 102.

Method 700 may include optionally, at block 712, receiving, by the base station 102, at least one of data or control information from the UE 104. For example, in an aspect, the transceiver 406 (in conjunction with communicating component 190 and/or the processor(s) 190), may receive at least one of one or more data or control signals transmitted by the UE 104. The UE 104 transmits at least one of one or more data signals or one or more control signals in accordance with the one or more precoding schemes that the base station 102 transmitted to the UE 104.

In another aspect, when a channel between the UE 104 and the base station 102 has uplink-downlink reciprocity, the precoding scheme selecting component 414 may select a precoding scheme for downlink transmissions based on one or more reference signals, one or more data signals and/or one or more control signals from UE 104. For example, in an aspect, the precoding scheme selecting component 414 may use the SRS transmitted by the UE 104 to estimate a channel and, if the channel has uplink-downlink reciprocity, then the precoding scheme selecting component 414 may use the channel estimate for downlink scheduling.

Additionally, or alternatively, in an aspect, the precoding scheme selecting component 414 may semi-statically or dynamically select a precoding scheme for transmissions. For example, in an aspect, the precoding scheme selecting component 414 may select a semi-static precoding matrix and/or semi-static number of antenna ports 458 (e.g., eight antenna ports) for SRS transmissions, while the precoding scheme selecting component 414 may dynamically select a precoding matrix and/or a dynamic number of antenna ports 458 for PUCCH and/or PUSCH transmissions.

Figure 8:
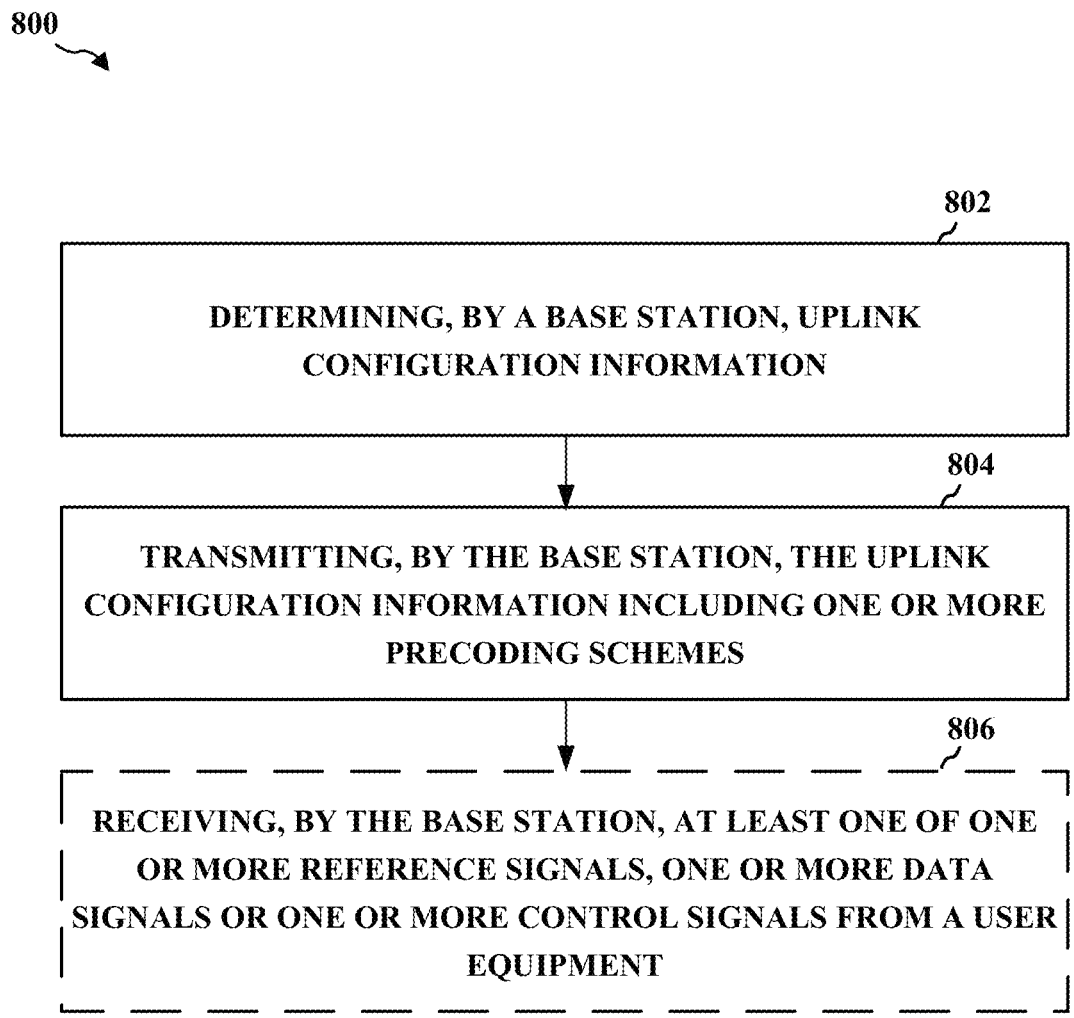
FIG. 8 is a diagram illustrating a second example method for determining one or more precoding schemes by a base station in accordance with various aspects of the present disclosure.

FIG. 8 illustrates a method 800 for determining one or more precoding schemes by a base station in accordance with a second embodiment. In an aspect, method 800 may include, at block 802, determining, by the base station 102, uplink configuration information. For example, in an aspect, the precoding scheme selecting component 414 (e.g., in conjunction with the memory 405 and/or the processor(s) 406) may determine uplink configuration information for at least one of references signals over one or more uplink channels, data over one or more data channels (e.g., PUSCH) and control information over one or more control channels (PUCCH). For example, in an aspect, the uplink configuration information may include one or more preferred precoding schemes, an indication of one or more preferred precoding matrices (e.g., preferred or non-preferred) and/or an indication of one or more preferred antenna ports 458 (e.g., preferred or non-preferred) for transmitting uplink configuration information for at least one of references signals over one or more uplink channels, data signals over one or more data channels (e.g., PUSCH) and control signals over one or more control channels (PUCCH) to the base station 102. In an aspect, the base station 102 may select the one or more precoding schemes for the one or more uplink signals independently of one or more preferred precoding schemes preferred by the UE 104. Additionally, alternatively, as will be described herein (e.g., FIG. 9), the base station 102 may select the one or more precoding schemes for the one or more uplink signals based at least in part on one or more preferred precoding schemes preferred by the UE 104.

Additionally, or alternatively, in an aspect, the precoding scheme selecting component 414 may choose to select a precoding scheme for the uplink configuration information based on one or more other performance impact factors such as, but not limited to, at least one of an indication from the UE 104 indicating one or more preferred precoding schemes in one or more reference signals, interference from a neighboring cell, historical feedback information or a link budget of the UE 104. For example, in an aspect, the precoding scheme selecting component 414 may identify feedback information stored in, e.g., the memory 405. For example, the precoding scheme selecting component 414 may identify feedback (e.g., ACK or NACK) information related to one or more scheduling grants previously transmitted by the base station 102 to the at least one UE 104. For example, in an aspect, the precoding scheme selecting component 414 may select the precoding scheme based on a link budget of the UE 104. For example, in an aspect, the precoding scheme selecting component 414 may determine that the at least one UE 104 is positioned at or near an edge of a serving cell of the base station 102. In this case, the precoding scheme selecting component 414 may choose to select only a small number of (e.g., one or two) uplink antenna ports 458. Thus, according to the present aspects, the precoding scheme selecting component 414 may make an informed selection of the precoding scheme for reference signal transmissions.

Method 800 may include, at block 804, transmitting, by the base station 102, the uplink configuration information including the one or more selected precoding schemes to the UE 104. In an aspect, for example, the scheduling grant transmitting component 416 may (e.g., in conjunction the memory 405 and/or the processor(s) 403) transmit the uplink configuration information including at least one of references signals over one or more uplink channels, data signals over one or more data channels (e.g., PUSCH) and control signals over one or more control channels (PUCCH) to the UE 104. For example, in an aspect, the reference signal configuration information can include an indication of one or more preferred precoding matrices (e.g., preferred or non-preferred) and/or an indication of one or more preferred antenna ports 458 (e.g., preferred or non-preferred) for transmitting one or more reference signals, one or more data signals and/or one or more control signals to the base station 102.

Method 800 may include optionally, at block 806, receiving at least one of one or more reference signals, one or more data signals or one or more control signals at the base station 102. For example, in an aspect, the transceiver 406 (in conjunction with the processor(s) 190), may receive at least one or more of reference signals, one or more data signals or one or more control signals transmitted by the UE 104. The UE 104 transmits at least one of one or more of reference signals, one or more data signals or one or more control signals in accordance with the one or more precoding schemes that the base station 102 transmitted to the UE 104.

Additionally, or alternatively, in an aspect, the precoding scheme selecting component 414 may choose to select a precoding scheme for the uplink configuration information based on one or more other performance impact factors performance impact factors such as, but not limited to, at least one of interference from a neighboring cell, historical feedback information or a link budget of the UE 104. For example, in an aspect, the precoding scheme selecting component 414 may identify feedback information stored in, e.g., the memory 405. For example, the precoding scheme selecting component 414 may identify feedback (e.g., ACK or NACK) information related to one or more scheduling grants previously transmitted by the base station 102 to the at least one UE 104. In an aspect, for example, the precoding scheme selecting component 414 may choose not to select a precoding scheme that was previously rejected or otherwise not accepted by the at least one UE 104. For example, in an aspect, the precoding scheme selecting component 414 may select the precoding scheme based on a link budget of the UE 104. For example, in an aspect, the precoding scheme selecting component 414 may determine that the at least one UE 104 is positioned at or near an edge of a serving cell of the base station 102. In this case, the precoding scheme selecting component 414 may choose to select only a small number of (e.g., one or two) uplink antenna ports 458. Thus, according to the present aspects, the precoding scheme selecting component 414 may make an informed selection of the precoding scheme for reference signal transmissions.

In another aspect, when a channel between the UE 104 and the base station 102 has uplink-downlink reciprocity, the precoding scheme selecting component 414 may select a precoding scheme for downlink transmissions based on one or more reference signals, one or more data signals and/or one or more control signals from UE 104. For example, in an aspect, the precoding scheme selecting component 414 may use the SRS transmitted by the UE 104 to estimate a channel and, if the channel has uplink-downlink reciprocity, then the precoding scheme selecting component 414 may use the channel estimate for downlink scheduling.

Additionally, or alternatively, in an aspect, the precoding scheme selecting component 414 may choose to select a precoding scheme for the uplink configuration information based on one or more other performance impact factors such as, but not limited to, at least one of an indication from the UE 104 indicating one or more preferred precoding schemes in one or more reference signals, interference from a neighboring cell, historical feedback information or a link budget of the UE 104. For example, in an aspect, the precoding scheme selecting component 414 may identify feedback information stored in, e.g., the memory 405. For example, the precoding scheme selecting component 414 may identify feedback (e.g., ACK or NACK) information related to one or more scheduling grants previously transmitted by the base station 102 to the at least one UE 104. For example, in an aspect, the precoding scheme selecting component 414 may select the precoding scheme based on a link budget of the UE 104. For example, in an aspect, the precoding scheme selecting component 414 may determine that the at least one UE 104 is positioned at or near an edge of a serving cell of the base station 102. In this case, the precoding scheme selecting component 414 may choose to select only a small number of (e.g., one or two) uplink antenna ports 458. Thus, according to the present aspects, the precoding scheme selecting component 414 may make an informed selection of the precoding scheme for reference signal transmissions.

Figure 9:
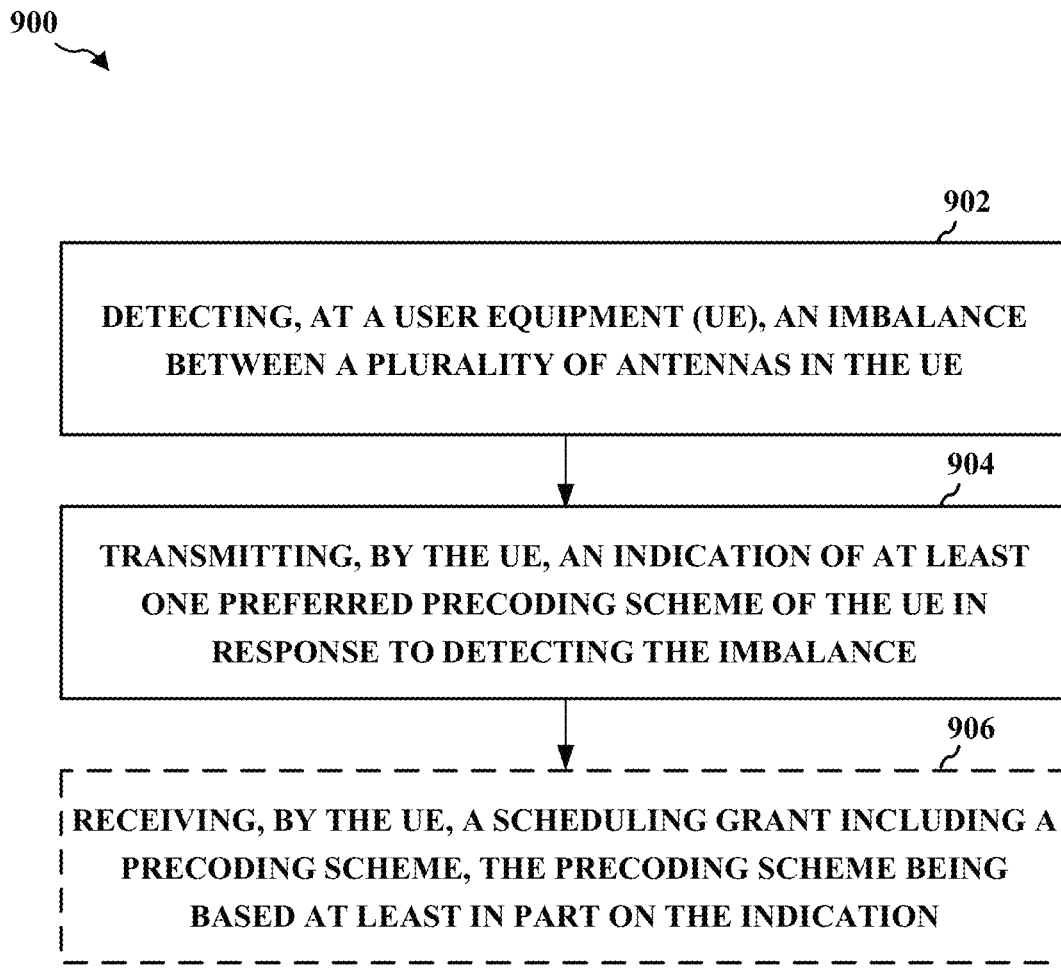
FIG. 9 is a diagram illustrating an example method for detecting an antenna imbalance and assisting in uplink and/or downlink precoding scheme selection, in accordance with various aspects of the present disclosure.

FIG. 9 illustrates a method 900 for detecting an antenna imbalance and assisting in precoding scheme selection. In an aspect, method 900 may include, at block 902, detecting, at a UE 104, an imbalance between a plurality of antennas 458. In an aspect, for example, the imbalance detecting component 418 (e.g., in conjunction with the memory 455 and/or the processor(s) 453) may be configured to detect an imbalance between the plurality of antennas 458. For example, in an aspect, the imbalance detecting component 418 may measure a signal strength (e.g., signal-to-noise ratio) associated with each of the plurality of antennas 458. One or more of the plurality of antennas 458 may be blocked by an obstacle such as, for example, a hand 432 of a user of the UE 104. Accordingly, the imbalance detecting component 418 may measure a lower signal strength for the one or more blocked antennas 458 than, for example, an antenna 458 that is not blocked by an obstacle. In addition, certain beamforming directions of each of the plurality of antennas 458 may be blocked due to an obstacle (e.g., building) 430 in an environment of the UE 104. In this case, the imbalance detecting component 418 may measure a lower signal strength in the blocked beamforming directions than, for example, a beamforming direction that is not blocked. Additionally, or alternatively, each of the plurality of antennas 458 may be located at different positions on the UE 104 and thus, the imbalance detecting component 418 may measure a permanent imbalance between each of the plurality of antennas 458 in terms of signal strength.

Method 900 may include, at block 904, transmitting, by the UE 104, an indication of at least one preferred precoding scheme of the UE 104 in response to detecting the imbalance. In an aspect, for example, the preference indicating component 420 (e.g., in conjunction with the memory 455, processor(s) 453, and/or transceiver 456) may transmit an indication of at least one preferred precoding scheme in response to detecting the imbalance at, e.g., block 502. In an aspect, the preference indicating component 420 may identify that certain precoding schemes would not work well for uplink transmissions based on the detection of antenna imbalance, blockage, and/or nearby obstacle(s). For example, in an aspect, the preference indicating component 420 may identify that one or more antennas of the plurality of antennas 458 and/or one or more precoding matrices of a plurality of potential precoding matrices (e.g., beamforming directions) associated with an antenna 458 are not preferred for uplink transmissions based on the detected imbalance. In an aspect, for example, the preference indicating component 420 may rank each of the plurality of the potential antennas 458 and/or each of the plurality of potential precoding matrices in order from highest to lowest preference based on the detected imbalance. For example, the preference indicating component 420 may rank each antenna 458 in order from highest to lowest signal strength. For example, the preference indicating component 420 may rank an antenna 458 that is not blocked by an obstacle 432 higher than an antenna 458 that is blocked by the obstacle 432. Further, and more specifically, the preference indicating component 420 may rank each precoding matrix in order from highest to lowest signal strength. For example, the preference indicating component 420 may rank a beamforming direction that is not blocked by an obstacle 430 higher than a beamforming direction that is blocked by the obstacle 430.

In an aspect, preference indicating component 420 may explicitly transmit preference information about precoding schemes. For example, in an aspect, the preference indicating component 420 may transmit a message containing an indication of one or more precoding matrices (e.g., preferred or non-preferred) and/or an indication of one or more antenna ports 458 (e.g., preferred or non-preferred) to base station 102. For example, in an aspect, the preference indicating component 420 may transmit a control signal (e.g., PUCCH) including a list of preferred or non-preferred precoding matrix indications (PMIs). Additionally, or alternatively, the preference indicating component 420 may transmit the control signal including a list of preferred or non-preferred antennas 458.

In another aspect, the preference indicating component 420 may implicitly transmit the preference information by beamforming a reference signal (e.g., SRS) according to the at least one preferred precoding scheme. For example, based on previous downlink reference signals such as, but not limited to CSI-RS (see, e.g., FIG. 2A), preference indicating component 420 may decide that a rank of the uplink channel equals approximately one. In this case, the preference indicating component 420 may choose to beamform the SRS along the best beam to improve sounding quality.

In another aspect, the preference indicating component 420 may determine that one or more antennas of the plurality of antennas 458 should not be used for uplink transmissions. For example, in an aspect, the preference indicating component 420 may implicitly transmit the preference information by beamforming the SRS in a manner that avoids the one or more antennas 458 that should not be used for uplink transmissions. For example, the preference indicating component 420 may transmit the SRS using only one or more of the preferred antennas 458.

In yet another aspect, the preference indicating component 420 may convey preference for one or more antennas of the plurality of antennas 458 by, for example, allocating a larger proportion of transmit power to that antenna 458 when the SRS is transmitted. For example, in an aspect, the preference indicating component 420 may determine a total amount of transmit power that is available for transmitting the SRS. In an aspect, the preference indicating component 420 may allocate a first portion of the total transmit power to one or more of the preferred antennas 458 and may allocate a second portion of the total transmit power to one or more of the non-preferred antennas 458, where the first portion of the total transmit power is greater than the second portion of the total transmit power. Thus, as will be described herein, the UE 104 may assist the base station 102 in scheduling precoding schemes by sending a SRS that is more tailored to the situation (e.g., by sending a SRS that indicates a preferred or non-preferred uplink precoding scheme).

Method 900 may optionally include, at block 906, receiving, by the UE 104, a scheduling grant including a precoding scheme, the precoding scheme being based at least in part on the indication. In an aspect, for example, configuration receiving component 422 (e.g., in conjunction with the memory 455 and/or the processor(s) 453) may receive a scheduling grant including a precoding scheme from the base station 102. As will be described herein, the base station 102 may select the precoding scheme based at least in part on the one or more preferred precoding schemes of the UE 104. Additionally, or alternatively, in an aspect, the base station 102 may select the precoding scheme independently of the one or more preferred precoding schemes of the UE 104.

In an aspect, the UE 104 may dynamically manage a set of uplink antenna ports 458 based on its own measurement or based on an indication of a set of uplink antenna ports 458 for SRS and/or other channels (PUCCH or PUSCH operations) received from the base station 102. For example, in an aspect, the UE 104 may measure an imbalance between each of the plurality of antennas 458, identify one or more preferred precoding schemes (e.g., preferred uplink antenna port and/or preferred uplink precoding matrix) based on the measured imbalance, and transmit uplink transmissions (e.g., SRS) using the one or more identified preferred precoding schemes. Additionally, or alternatively, in an aspect, the UE 104 may receive an indication from the base station 102 including a precoding scheme to use for uplink transmissions such as, but not limited to, a SRS transmission (see FIG. 2C) and/or other transmission over PUCCH (see FIG. 2D) or PUSCH (see FIG. 2D). For example, in an aspect, the UE 104 may transmit uplink transmissions according to the precoding scheme included in the indication from the base station 102. In an aspect, the antenna ports 458 used by the UE 104 for uplink transmissions may be based on the precoding scheme received in the indication from the base station 102, the one or more preferred precoding schemes identified by the UE 104, or a combination of these inputs. For example, the UE 104 may be configured with eight uplink antenna ports 458, but only four (4) of the uplink antenna ports 458 may be enabled during a first transmission time interval ("t1"), while six (6) of the uplink antenna ports 458 may be enabled during a second transmission time interval ("t2"). In other words, this is dynamic uplink port management in light of possibly dynamic antenna imbalances.

In another aspect, the UE 104 may follow instructions from the base station 102 regarding how to configure uplink antenna ports 458, as opposed to selecting a precoding scheme based on a detection of an antenna imbalance. For example, in an aspect, the UE 104 may receive an indication from the base station 102 including a number of antenna ports 458 and/or precoding matrix to use for SRS and/or other channels (e.g., PUCCH or PUSCH), and this indication may change, e.g., dynamically or semi-statically. For example, in an aspect, the UE 104 may transmit a SRS based on a semi-static number of antennas ports 458 (e.g., eight ports), while PUCCH and/or PUSCH transmissions may be based on a dynamic number of antenna ports 458. When a dynamic number of antenna ports 458 is determined, the UE 104 processes PUSCH accordingly (codebook determination, PMI determination, etc.).

Figure 10:
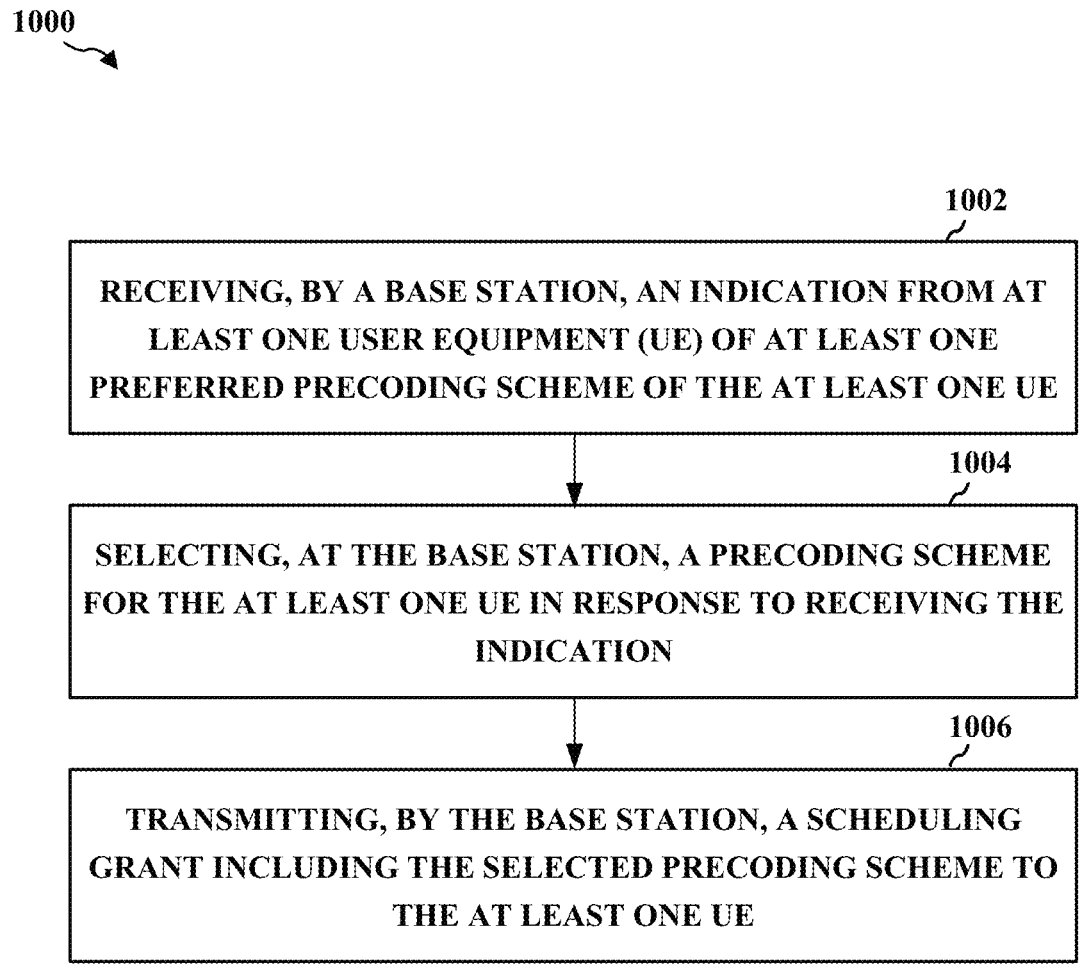
FIG. 10 is a diagram illustrating an example method for selecting an uplink and/or downlink precoding scheme, in accordance with various aspects of the present disclosure.

FIG. 10 illustrates a method 1000 for selecting a precoding scheme. In an aspect, method 600 may include, at block 1002, receiving, by a base station 102, an indication from at least one UE 104 of at least one preferred precoding scheme of the at least one UE 104. In an aspect, for example, the preference receiving component 412 (e.g., in conjunction with the memory 405 and/or the processor(s) 403) may receive an indication from at least one UE 104 of the at least one preferred precoding scheme of the at least one UE 104. The at least one UE 104 may identify the at least one preferred precoding scheme and transmit the indication of the at least one preferred precoding scheme, as described above with respect to, e.g. FIG. 5. In an aspect, for example, the preference receiving component 412 may receive a control signal (e.g., PUCCH) that includes an indication of one or more preferred PMIs, one or more non-preferred PMIs, one or more preferred antennas 458, and/or one or more non-preferred antennas 458 from the at least one UE 104. In another aspect, the preference receiving component 412 may receive a reference signal (e.g., SRS) that has been precoded by at least one UE 104 according to a preferred precoding matrix of the at least one UE 104. Additionally, or alternatively, in an aspect, the preference receiving component 412 may receive a SRS via at least one preferred antenna 458 of the at least one UE 104.

Method 1000 may include, at block 1004, selecting, at the base station 102, a precoding scheme in response to receiving the indication. In an aspect, for example, the precoding scheme selecting component 414 (e.g., in conjunction with the memory 405 and/or the processor(s) 403) may select the precoding scheme in response to receiving the indication at, e.g., block 602. In an aspect, the precoding scheme selecting component 414 may select one of the preferred precoding matrices and/or at least one of the preferred antennas 458 either explicitly or implicitly indicated by the received indication. Additionally, or alternatively, in an aspect, the precoding scheme selecting component 414 may choose to select a precoding scheme based on a variety of other performance impact factors such as, but not limited to, interference from a neighboring cell. Thus, according to the present aspects, the precoding scheme selecting component 414 may make an informed selection of the precoding scheme for data transmissions.

For example, in an aspect, the precoding scheme selecting component 414 may select the precoding scheme based on a preferred precoding scheme explicitly indicated by the received SRS. For example, the precoding scheme selecting component 414 may select an uplink precoding matrix based on one or more preferred or non-preferred PMIs included in the received control signal. Additionally, or alternatively, the precoding scheme selecting component 414 may select a set of uplink antenna ports 458 based on one or more preferred or non-preferred antennas 458 explicitly included in the received control signal.

In another aspect, the precoding scheme selecting component 414 may select the precoding scheme based on a preferred precoding scheme implicitly indicated by the received SRS. For example, the precoding scheme selecting component 414 may measure a signal strength of the received SRS and determine that the measured signal strength satisfies a threshold. As described above with respect to FIG. 5, the received SRS may have been transmitted by the UE 104 using one or more preferred antennas 458 and/or may have been precoded by the UE 104 according to the preferred precoding matrix. Thus, in response to determining that the measured signal strength satisfies a threshold, the precoding scheme selecting component 414 may determine that the at least one UE 104 should continue to use the preferred precoding matrix and/or preferred antenna 458 for uplink transmissions. Accordingly, the precoding scheme selecting component 414 may select the preferred precoding matrix and/or preferred antenna 458 of the at least one UE 104.

Additionally, or alternatively, in an aspect, the precoding scheme selecting component 414 may select the precoding scheme based on a level of interference. For example, in an aspect, the precoding scheme selecting component 414 may identify interference from a neighboring cell. Accordingly, the precoding scheme selecting component 414 may select a precoding matrix that avoids (e.g., is directed away from) the identified interference.

Additionally, or alternatively, the precoding scheme selecting component 414 may select the precoding scheme based on historical feedback information. For example, in an aspect, the precoding scheme selecting component 414 may identify feedback information stored in, e.g., the memory 405. For example, the precoding scheme selecting component 414 may identify feedback (e.g., ACK or NACK) information related to one or more scheduling grants previously transmitted by the base station 102 to the at least one UE 104. In an aspect, for example, the precoding scheme selecting component 414 may choose not to select a precoding scheme that was previously rejected or otherwise not accepted by the at least one UE 104.

Additionally, or alternatively, in an aspect, the precoding scheme selecting component 414 may select the precoding scheme based on a link budget of the UE 104. For example, in an aspect, the precoding scheme selecting component 414 may determine that the at least one UE 104 is positioned at or near an edge of a serving cell of the base station 102. In this case, the precoding scheme selecting component 414 may choose to select only a small number of (e.g., one or two) uplink antenna ports 458.

Moreover, in an aspect, the precoding scheme selecting component 414 may select a precoding scheme for a first UE 104 based on the indication (e.g., reference signal and/or control signal) received from the first UE 104, as well as the indication received from at least one second UE 104. For example, in an aspect, the precoding scheme selecting component 414 may use the indication of preferred precoding schemes received from each UE 104 to decide how to pair the UEs 104 for multi-user MIMO uplink transmissions.

In another aspect, when a channel between the UE 104 and the base station 102 has uplink-downlink reciprocity, the precoding scheme selecting component 414 may select a precoding scheme for downlink transmissions based on the reference signal and/or control signal from UE 104. For example, in an aspect, the precoding scheme selecting component 414 may use the SRS transmitted by the UE 104 to estimate a channel and, if the channel has uplink-downlink reciprocity, then the precoding scheme selecting component 414 may use the channel estimate for downlink scheduling.

Additionally, or alternatively, in an aspect, the precoding scheme selecting component 414 may semi-statically or dynamically select a precoding scheme for transmissions. In an aspect, the base station 102 may dynamically and/or semi-statically select the precoding scheme independently of the preferred precoding schemes of UE 104. For example, in an aspect, the precoding scheme selecting component 414 may select a semi-static precoding matrix and/or semi-static number of antenna ports 458 (e.g., eight antenna ports) for SRS transmissions, while the precoding scheme selecting component 414 may dynamically select a precoding matrix and/or a dynamic number of antenna ports 458 for PUCCH and/or PUSCH transmissions.

Method 1000 may include, at block 1006, transmitting, by the base station 102, a scheduling grant including the selected precoding scheme to the at least one UE 104. In an aspect, for example, scheduling grant transmitting component 416 may (e.g., in conjunction with the memory 405 and/or the processor(s) 403) transmit a scheduling grant including the precoding scheme selected at, e.g., block 604 to the at least one UE 104. For example, in an aspect, the scheduling grant transmitting component 416 may transmit an uplink scheduling grant, or other indication, including a selected precoding scheme for uplink transmissions such as, but not limited to, SRS transmissions or other PUCCH or PUSCH transmissions. In another aspect, the scheduling grant transmitting component 416 may transmit a downlink scheduling grant or a downlink transmission based on a selected precoding scheme for downlink transmissions.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, the method comprising:
    receiving, by a user equipment (UE), reference signal configuration information from a base station;
    configuring two or more uplink antenna ports of the UE based on the received reference signal configuration information; and
    transmitting, by the UE, two or more reference signals to the base station on the two or more uplink antenna ports in accordance with the received reference signal configuration information and an indication of at least one preferred precoding scheme that is preferred by the UE,
    wherein transmitting the two or more reference signals to the base station includes transmitting one or more reference signals using one or more uplink antenna ports during a first transmission interval and transmitting one or more reference signals using one or more uplink antenna ports during a second transmission interval.

2. The method of claim 1, further comprising:
    receiving, by the UE, uplink configuration information for at least one of two or more data channels or two or more control channels;
    configuring two or more uplink antenna ports of the UE based on the uplink configuration information; and
    transmitting, by the UE, two or more uplink signals on the at least one of two or more data channels or the two or more control channels in accordance with the uplink configuration information,
    wherein the uplink configuration information is based at least on the two or more reference signals transmitted to the base station.

3. The method of claim 2, wherein the received reference signal configuration information further comprises at least one preferred precoding scheme for transmitting the two or more-reference signals.

4. The method of claim 3, wherein the preferred precoding schemes for transmitting the two or more-reference signals is based on at least one of the two or more reference signals transmitted to the base station, the indication from the UE indicating one or more preferred precoding schemes in two or more of the reference signals, a level of interference, historical feedback information, feedback from the UE related to one or more preferred precoding schemes transmitted to the UE, or a link budget of the UE.

5. The method of claim 4 further comprising:
    detecting, at the UE, an imbalance between a plurality of antennas in the UE; and
    wherein the transmitting, by the UE, the indication of at least one preferred precoding scheme that is preferred by the UE is in response to detecting the imbalance.

6. The method of claim 5, further comprising:
    identifying, by the UE, based on the detected imbalance, one or more of:
        at least one preferred precoding matrix,
        at least one non-preferred precoding matrix,
        at least two preferred antennas of the plurality of antennas, or
        at least two non-preferred antennas of the plurality of antennas for uplink transmissions.

7. The method of claim 6, wherein transmitting the indication further comprises:
    transmitting a control signal indicative of the at least one preferred precoding matrix or the at least one non-preferred precoding matrix.

8. The method of claim 7, wherein transmitting the indication further comprises:
    transmitting a control signal indicative of at least two preferred ports associated with at least two preferred antennas or the at least two non-preferred ports associated with at least two non-preferred antennas.

9. The method of claim 7, wherein transmitting the indication further comprises:
transmitting a reference signal according to the at least one preferred precoding matrix.

10. The method of claim 2, wherein the received uplink configuration information further comprises at least one preferred precoding scheme for transmitting the two or more uplink signals.

11. The method of claim 2, further comprising receiving, at a user equipment (UE) from the base station, at least one of reference signal configuration information and uplink configuration information for at least one of two or more data channels and two or more control channels, wherein at least one of the reference signal configuration information and uplink configuration information changes dynamically or semi-statically.

12. An apparatus for wireless communication, comprising:
a transceiver;
a memory configured to store instructions; and
one or more processors communicatively coupled with the transceiver and the memory, the one or more processors configured to execute the instructions to:
receive, from a base station, reference signal configuration information from a base station;
configure two or more uplink antenna ports of the UE based on the received reference signal configuration information; and
transmit two or more reference signals to the base station on the two or more uplink antenna ports in accordance with the received reference signal configuration information and an indication of at least one preferred precoding scheme that is preferred by the UE,
wherein the transmit the two or more reference signals to the base station includes transmitting one or more reference signals using one or more uplink antenna ports during a first transmission interval and transmitting one or more reference signals using one or more uplink antenna ports during a second transmission interval.

13. The apparatus of claim 12, wherein the one or more processors are further configured to:
receive, from the base station, uplink configuration information for at least one of two or more data channels and two or more control channels;
configure two or more uplink antenna ports of the UE based on the uplink configuration information; and
transmit two or more uplink signals on the at least one of two or more data channels or the two or more control channels in accordance with the uplink configuration information,
wherein the uplink configuration information is based at least on the two or more reference signals transmitted to the base station.

14. The apparatus of claim 13, wherein the received reference signal configuration information further comprises at least one preferred precoding scheme for transmitting the two or more-reference signals.

15. The apparatus of claim 14, wherein the preferred precoding schemes for transmitting the two or more-reference signals is based on at least one of the two or more reference signals transmitted to the base station, the indication from the UE indicating one or more preferred precoding schemes in two or more of the reference signals, a level of interference, historical feedback information, feedback from the UE related to one or more preferred precoding schemes transmitted to the UE, or a link budget of the UE.

16. The apparatus of claim 15, wherein the one or more processors are further configured to:
detect an imbalance between a plurality of antennas in the UE; and
wherein the transmit the indication of at least one preferred precoding scheme that is preferred by the UE in response to detecting the imbalance.

17. The apparatus of claim 16, wherein the one or more processors are further configured to:
identify, based on the detected imbalance, one or more of:
at least one preferred precoding matrix,
at least one non-preferred precoding matrix,
at least two preferred antennas of the plurality of antennas, or
at least two non-preferred antennas of the plurality of antennas for uplink transmissions.

18. The apparatus of claim 17, wherein the transmit the indication further comprises:
transmit a control signal indicative of the at least one preferred precoding matrix or the at least one non-preferred precoding matrix.

19. The apparatus of claim 18, wherein the transmit the indication further comprises:
transmit a control signal indicative of at least two preferred ports associated with at least two preferred antennas or the at least two non-preferred ports associated with at least two non-preferred antennas.

20. The apparatus of claim 17, wherein transmitting the indication further comprises:
transmitting a reference signal according to the at least one preferred precoding matrix.

21. The apparatus of claim 13, wherein the received uplink configuration information further comprises at least one preferred precoding scheme for transmitting the two or more uplink signals.

22. The apparatus of claim 13, wherein the one or more processors are further configured to:
receive, from the base station, at least one of reference signal configuration information and uplink configuration information for at least one of two or more data channels and two or more control channels, wherein at least one of the reference signal configuration information and uplink configuration information changes dynamically or semi-statically.

23. A method of wireless communication, the method comprising:
determining, by a base station, reference signal configuration information;
transmitting, by the base station, the reference signal configuration information to a user equipment (UE), the reference signal configuration information including one or more precoding schemes; and
receiving, by the base station, two or more reference signals transmitted by the UE in accordance with the reference signal configuration information and an indication of one or more precoding schemes that are preferred by the UE,
wherein receiving the two or more reference signals to the base station includes receiving one or more reference signals during a first transmission interval and receiving one or more reference signals during a second transmission interval.

24. The method of claim 23, the method further comprising:

determining, by the base station, uplink configuration information based at least on the two or more received reference signals, wherein the uplink configuration information including one or more precoding schemes for the UE to transmit at least one of data signals over two or more data channels or control signals over two or more control channels;

transmitting, by the base station, uplink configuration information to the UE, the uplink configuration information including one or more precoding schemes for the UE to transmit at least one of data signals over two or more data channels or control signals over two or more control channels; and receiving, by the base station, at least one of data signals over two or more channels or control signals over two or more control channels transmitted by the UE in accordance with the reference signal configuration information and the one or more precoding schemes.

25. The method of claim 24, wherein the determining reference signal configuration information is based on at least one of the indication from the UE indicating one or more preferred precoding schemes in two or more of the reference signals, a level of interference, historical feedback information, feedback from the UE related to one or more preferred precoding schemes transmitted to the UE, or a link budget of the UE.

26. The method of claim 25 wherein the indication from the UE indicating one or more preferred precoding schemes in one or more reference schemes is in response to the UE detecting an imbalance between a plurality of antennas in the UE, wherein the one or more preferred precoding schemes includes at least one of:
  at least one preferred precoding matrix,
  at least one non-preferred precoding matrix,
  at least two preferred antennas of the plurality of antennas, or
  at least two non-preferred antennas of the plurality of antennas for uplink transmissions.

27. An apparatus for wireless communication, comprising:
  a transceiver;
  a memory configured to store instructions; and
  one or more processors communicatively coupled with the transceiver and the memory, the one or more processors configured to execute the instructions to:
    determine, by a base station, reference signal configuration information;
    transmit, by the base station, the reference signal configuration information to a user equipment (UE), the reference signal configuration information including one or more precoding schemes; and
    receive, by the base station, two or more reference signals transmitted by the UE in accordance with the reference signal configuration information and an indication of one or more precoding schemes that are preferred by the UE,
  wherein the receive the two or more reference signals to the base station includes receiving one or more reference signals during a first transmission interval and receiving one or more reference signals during a second transmission interval.

28. The apparatus of claim 27, wherein the one or more processors are further configured to:
  determine, by the base station, uplink configuration information based at least on the two or more received reference signals, wherein the uplink configuration information including one or more precoding schemes for the UE to transmit at least one of data signals over two or more data channels or control signals over two or more control channels;
  transmit, by the base station, uplink configuration information to the UE, the uplink configuration information including one or more precoding schemes for the UE to transmit at least one of data signals over two or more data channels or control signals over two or more control channels; and
  receive, by the base station, at least one of data signals over two or more data channels or one or more control signals over two or more control channels transmitted by the UE in accordance with the reference signal configuration information and the one or more precoding schemes.

29. The apparatus of claim 28, wherein the determine reference signal configuration information is based on at least one of the indication from the UE indicating one or more preferred precoding schemes in two or more of the reference signals, a level of interference, historical feedback information, feedback from the UE related to one or more preferred precoding schemes transmitted to the UE, or a link budget of the UE.

30. The apparatus of claim 29, wherein the indication from the UE indicating one or more preferred precoding schemes in one or more reference schemes is in response to the UE detecting an imbalance between a plurality of antennas in the UE, wherein the one or more preferred precoding schemes includes at least one of:
  at least one preferred precoding matrix,
  at least one non-preferred precoding matrix,
  at least two preferred antennas of the plurality of antennas, or
  at least two non-preferred antennas of the plurality of antennas for uplink transmissions.

* * * * *